United States Patent
Roush

(10) Patent No.: US 7,780,224 B2
(45) Date of Patent: Aug. 24, 2010

(54) CRASH ATTENUATING UNDERRIDE GUARD

(75) Inventor: Mark A. Roush, Lafayette, IN (US)

(73) Assignee: Vanguard National Trailer Corporation, Monon, IN (US)

( * ) Notice: Subject to any disclaimer, the term of this patent is extended or adjusted under 35 U.S.C. 154(b) by 0 days.

(21) Appl. No.: 12/135,541

(22) Filed: Jun. 9, 2008

(65) Prior Publication Data

US 2008/0303311 A1 Dec. 11, 2008

Related U.S. Application Data

(60) Provisional application No. 60/933,882, filed on Jun. 8, 2007, provisional application No. 61/070,670, filed on Mar. 25, 2008.

(51) Int. Cl.
*B62D 35/00* (2006.01)

(52) U.S. Cl. .................... 296/180.4; 293/117

(58) Field of Classification Search .............. 296/180.1, 296/180.2, 180.4, 187.12, 187.02; 293/117
See application file for complete search history.

(56) References Cited

U.S. PATENT DOCUMENTS

| 495,801 A | 4/1893 | Henthorne |
|---|---|---|
| 564,027 A | 7/1896 | Pratt |
| 824,541 A | 6/1906 | Hager |
| 1,127,241 A | 2/1915 | Hawksworth |
| 3,743,343 A | 7/1973 | Grote |
| 4,008,915 A | 2/1977 | Walker |
| 4,060,268 A | 11/1977 | Page |
| 4,262,953 A | 4/1981 | Mcerlane |
| 4,321,989 A | 3/1982 | Meinzer |
| 4,359,239 A | 11/1982 | Eggert |
| 4,486,046 A | 12/1984 | Whitney |
| 4,640,541 A | 2/1987 | Fitzgerald |
| 4,657,121 A | 4/1987 | Uchida |
| 4,666,130 A | 5/1987 | Denman |
| 4,929,008 A | 5/1990 | Esfandiary |
| 4,938,524 A | 7/1990 | Straub |
| 5,048,863 A | 9/1991 | Henseler |
| 5,052,732 A | 10/1991 | Oplet |
| 5,242,185 A | 9/1993 | Carr |
| 5,375,882 A | 12/1994 | Koch |

(Continued)

FOREIGN PATENT DOCUMENTS

SE 05115804 5/2004

OTHER PUBLICATIONS

Block, Bryon and Luis Otto Faber Schmutzler. Improved Crashworthy Designs For Truck Underride Guards. 16th International Technical Conference on the Enhanced Safety of Vehicles in Windsor, Ontario, Canada. Oct. 1998.

*Primary Examiner*—Joseph D Pape
(74) *Attorney, Agent, or Firm*—Dowell Baker, P.C.

(57) ABSTRACT

An aerodynamic underride guard comprising an angled front section located ahead of the trailer landing gear, a crash attenuating middle section located between the trailer landing gear and the trailer wheel assembly, and an angled rear section located in proximity to the trailer wheel assembly. The front angled section deflects air away from the non-aerodynamic features of the trailer landing gear. The rear angled section deflects air away from the non-aerodynamic features of the trailer wheel assembly, and the crash attenuating middle section can prevent vehicles from under riding the trailer.

16 Claims, 29 Drawing Sheets

U.S. PATENT DOCUMENTS

| | | |
|---|---|---|
| 5,418,257 A | 5/1995 | Weisman |
| 5,542,365 A | 8/1996 | Jurisich |
| 5,735,560 A | 4/1998 | Bowen |
| 5,788,321 A | 8/1998 | McHorse |
| 5,839,760 A | 11/1998 | Johnson |
| 5,921,617 A | 7/1999 | Loewen |
| 5,947,452 A | 9/1999 | Albritton |
| 5,947,538 A | 9/1999 | White |
| 6,000,738 A | 12/1999 | Stewart |
| 6,068,329 A | 5/2000 | Miller |
| 6,076,871 A | 6/2000 | Jarvis |
| 6,085,878 A | 7/2000 | Araki |
| 6,109,675 A | 8/2000 | Sumrall |
| 6,116,667 A | 9/2000 | Torcomian |
| 6,176,529 B1 | 1/2001 | Kitzmiller |
| 6,199,942 B1 | 3/2001 | Carroll |
| 6,213,540 B1 | 4/2001 | Tusim |
| 6,394,513 B2 | 5/2002 | Rossmann |
| 6,401,887 B1 | 6/2002 | Hur |
| 6,450,556 B1 | 9/2002 | Jacobs |
| 6,644,720 B2 | 11/2003 | Long |
| 6,837,536 B1 | 1/2005 | Schwartz |
| 6,974,178 B2 | 12/2005 | Ortega |
| 7,086,674 B2 | 8/2006 | Goertz |
| 7,093,889 B2 | 8/2006 | Graham |
| 7,188,875 B2 | 3/2007 | Norelius |
| 7,284,788 B1 | 10/2007 | Barbat |
| 2001/0024043 A1 | 9/2001 | Breed |
| 2005/0104390 A1 | 5/2005 | Norelius |
| 2005/0280282 A1 | 12/2005 | Ran |
| 2008/0093887 A1 | 4/2008 | Wood |
| 2008/0116702 A1 | 5/2008 | Enz |

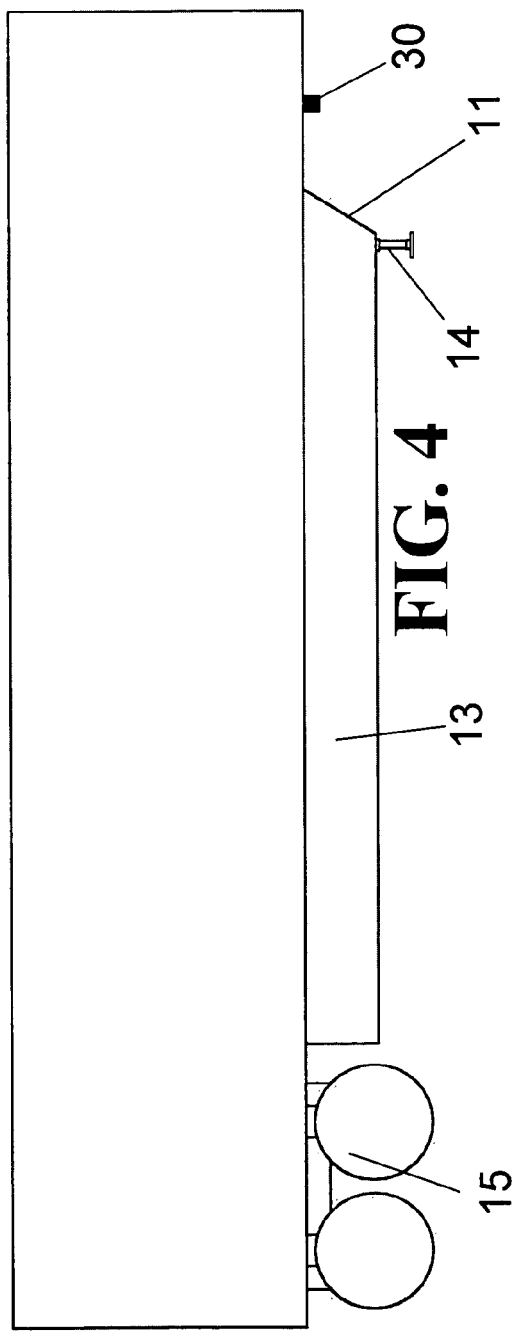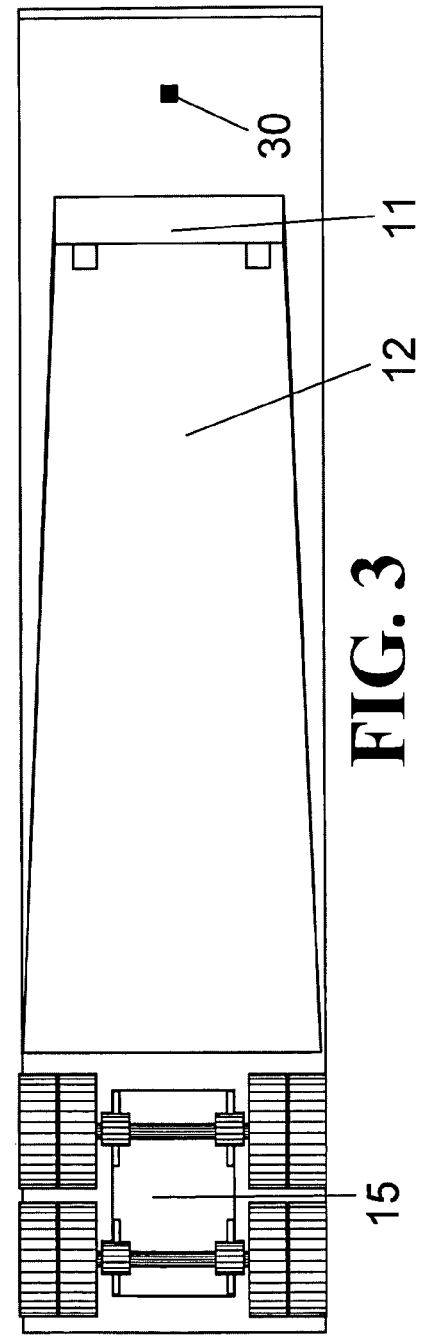

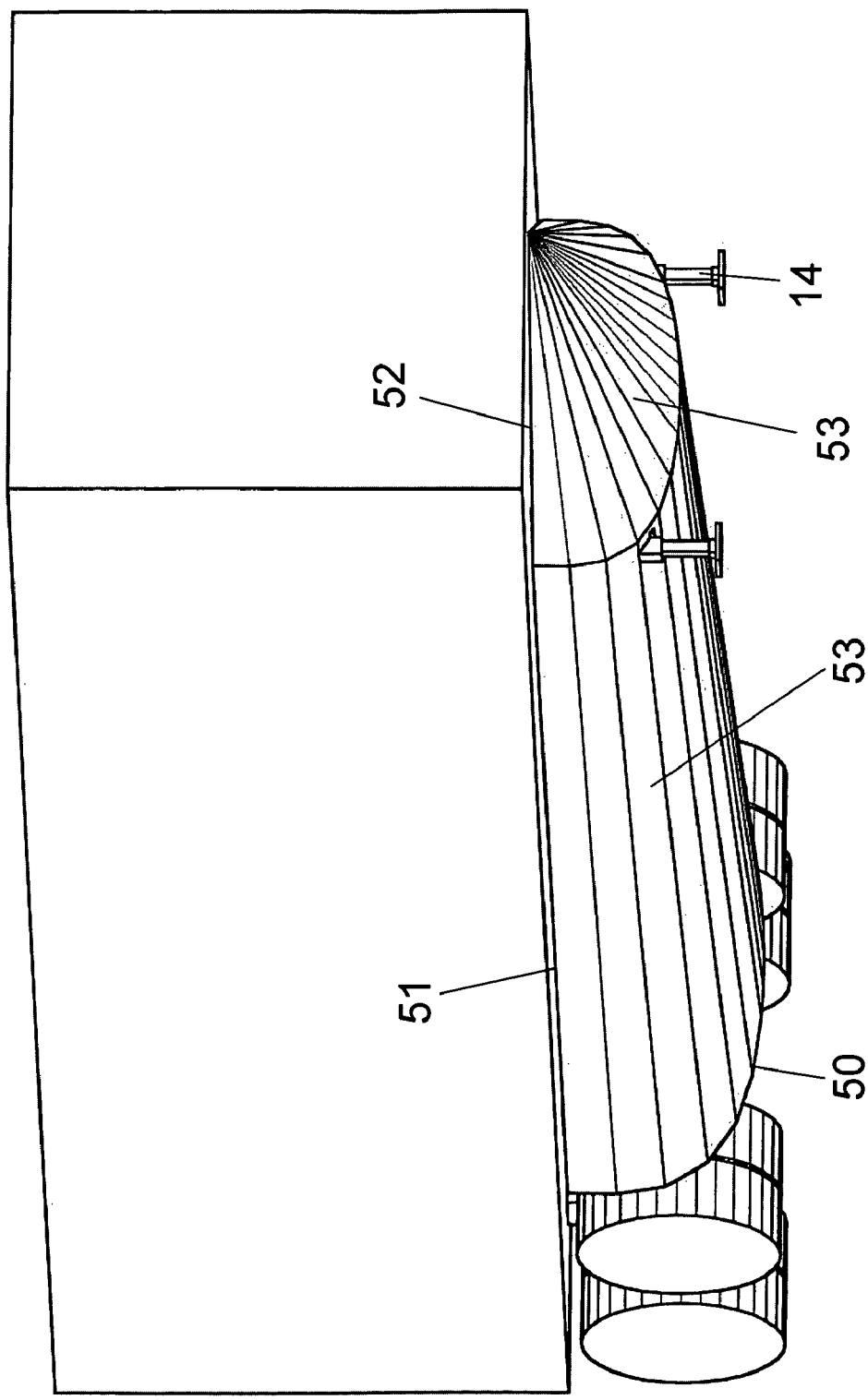

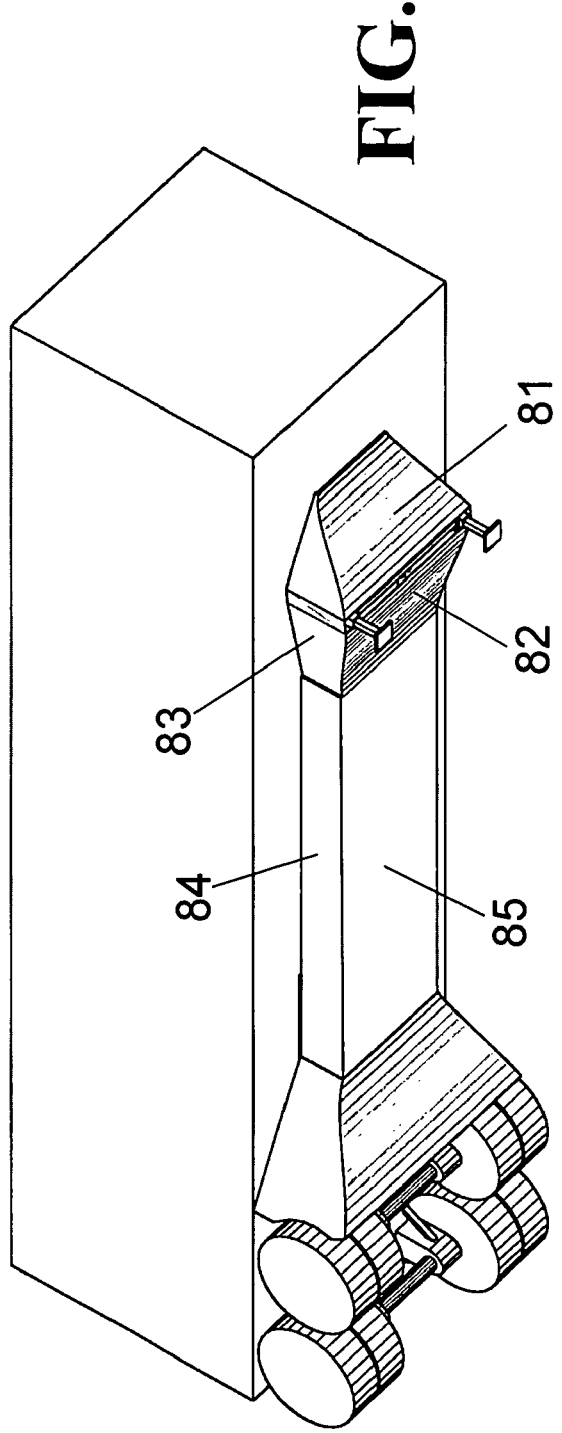
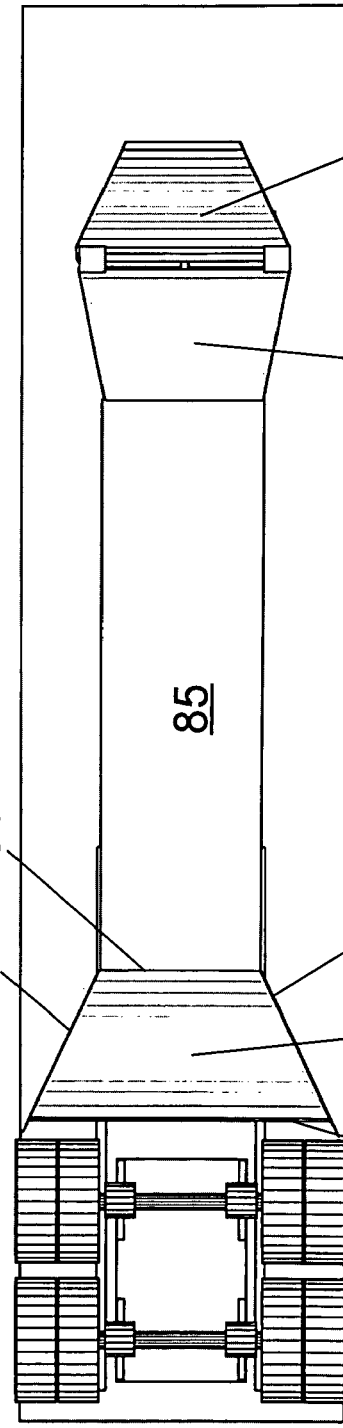
FIG. 8
FIG. 9

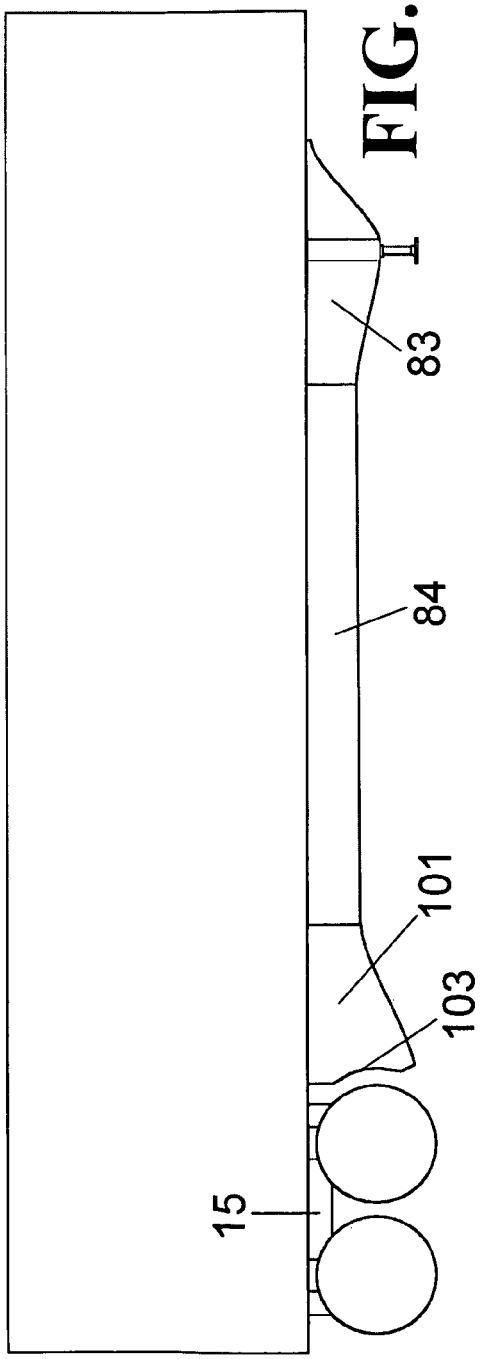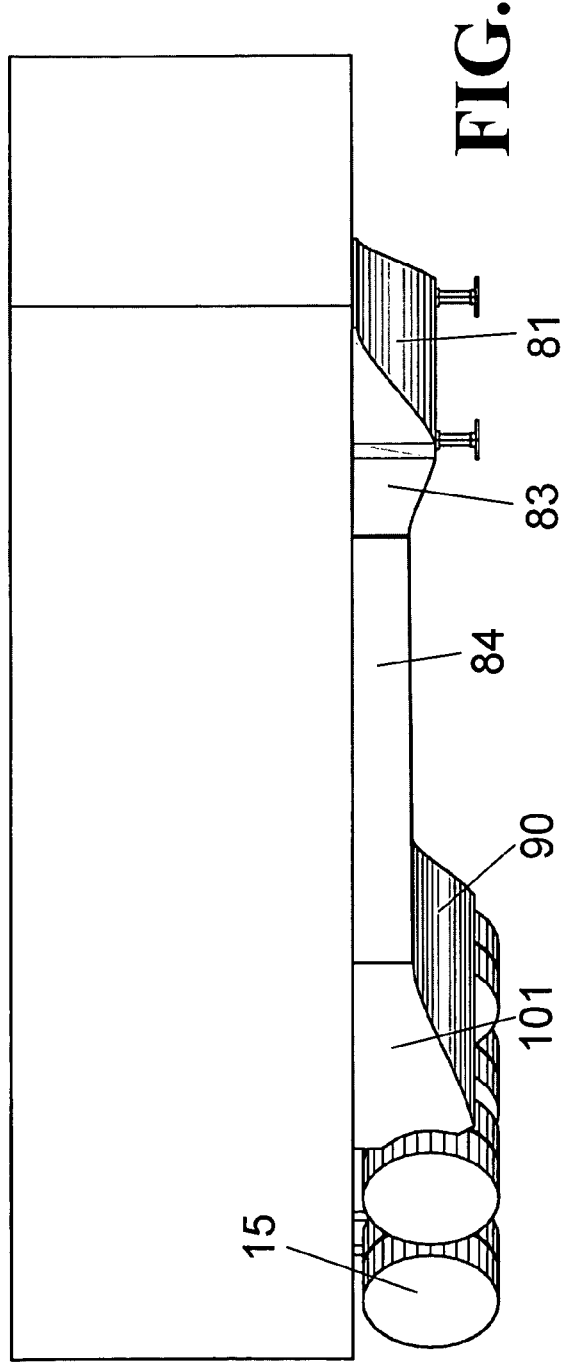

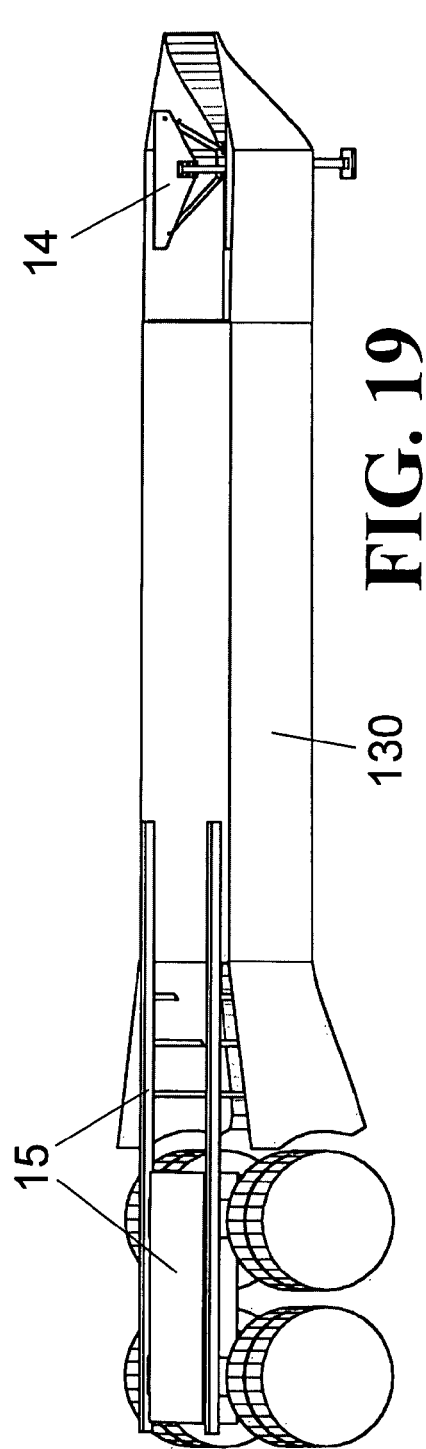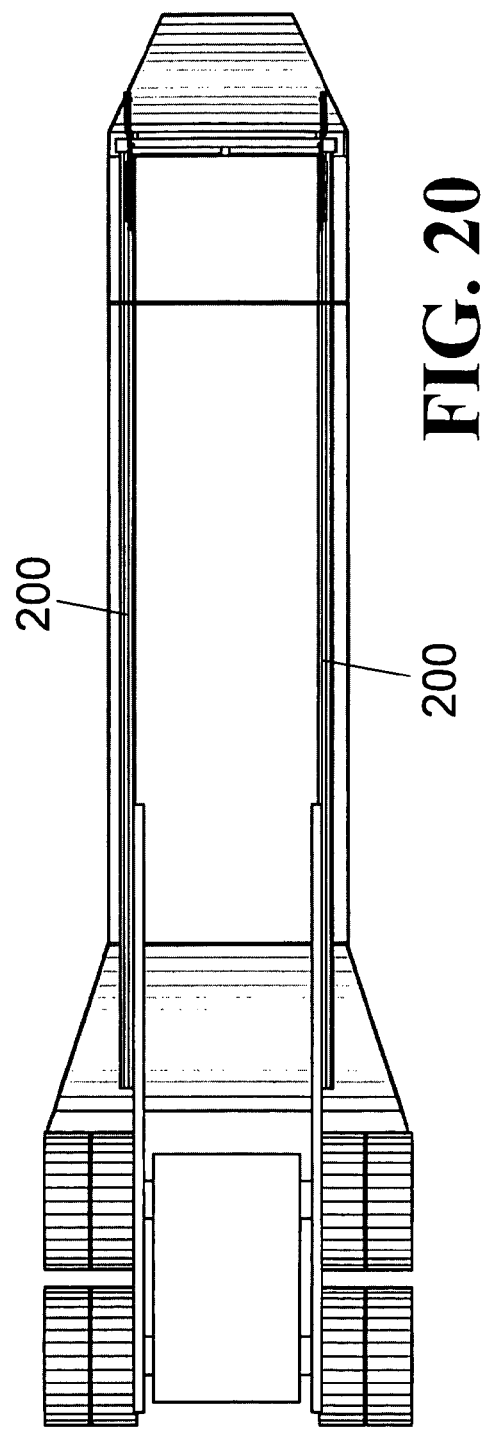
FIG. 19
FIG. 20

320

330

CRASH ATTENUATING UNDERRIDE GUARD

CROSS-REFERENCE TO RELATED APPLICATION

This application is claims priority to provisional application Ser. No. 60/933,882, entitled "Crash attenuating trailer underride guard" filed Jun. 8, 2007 and provisional application serial No. 61/070,670 filed Mar. 25, 2008 titled "Drag Reduction Arrangement for Cargo Trucks and Trailers" both to Mark Roush, the contents of which are all incorporated herein by reference.

FIELD OF THE INVENTION

This invention relates to aerodynamic fairings and crash attenuators for cargo containers. More specifically, it relates to an aerodynamic crash attenuating fairing for the underside of a tractor pulled trailer.

BACKGROUND OF THE INVENTION

Fairings are used to improve the aerodynamics of a vehicle. Fairings are typically added to the exterior of an existing vehicle to reduce drag when moved. Fairings may be added at many locations on tractors and trailers to improve the aerodynamics of these large vehicles. Fairings have been attached to the front and back of tractors as well as the front, top, bottom, and rear of the trailer. Fairings have also been placed in front of and behind the tires of a trailer to improve aerodynamics.

Landing gear supports a trailer in the absence of a tractor, but also the landing gear must be transported with the trailer when it is moved. Trailer landing gear has many non-aerodynamic features such as the structural supports for the landing gear. These non-aerodynamic features on the landing gear increase drag which increases the cost of transporting the trailer. Thus, it is desirable to have fairings to reduce the drag caused by the landing gear.

The wheel assemblies of trailers are also not aerodynamic and can increase the drag on the trailer when it is moved. Road debris can collect on the underside of the trailer during transportation and result in increased aerodynamic drag. Thus, it is desirable to have fairings that improve the aerodynamics of the trailer wheel assembly and the underside of the trailer.

Crash attenuators are energy absorbing systems that reduce the severity of vehicular collisions, especially the type involving a fast moving motor vehicle and a road barrier or a highway trailer vehicle. The success of crash impact attenuators is measured by the ability of the devices to limit the extent of injuries suffered by people and the damage done by the equipment as a consequence of such collisions.

Truck trailers typically have a higher elevation than passenger vehicles. This presents a risk that a passenger vehicle will underride the trailer in an accident, potentially resulting in damage to the underriding vehicle and injury to occupants therein. Accordingly, the United States Federal Motor Vehicle Safety Standards require the installation of underride guards or bumpers on certain trailers. The underride guards must comply with certain deflection and energy absorption requirements. Underride guards are common on the rear of trailers, however underride guards between the landing gear and wheel assembly of the trailer are less common.

A device positioned between the landing gear and wheel assembly of the trailer can function to prevent an impacting vehicle from under ridding the trailer. Additionally such a device can have features to reduce the aerodynamic drag on the trailer.

There have been attempts to solve some of these issues. For example, U.S. Pat. No. 4,262,953 that issued to McErlane teaches "an airfoil or deflector panel for being mounted ahead of the rearmost set of wheels of a vehicle such as a truck or tractor-drawn trailer to direct air flow in a manner which reduces the relatively negative air pressure normally occurring behind a moving vehicle. The surface of the deflector which is presented in the direction of vehicle motion has a bilateral or compound convex curve."

U.S. Pat. No. 5,052,732 that issued to Oplet teaches "a crash attenuator [that] includes a plurality of layers . . . of fibrous cellular material. Each of the layers is comprised of a plurality of hexagonal elongate cells fabricated of a fibrous cellulose material that has a longitudinal axis that is disposed horizontal to the ground such that the edge of the cell is directed toward the impacting vehicle. A flat sheet of fibrous material . . . is disposed between each of the layers to provide an energy dispersing surface. A rear impact plate . . . is disposed on the impacting end of the crash attenuator . . . and is fabricated from a soft metal. A front mounting plate . . . is disposed on the opposite end thereof and the two secured by tension cables . . . . The exterior of the layers . . . is covered by sheets . . . . Thereafter, a layer of moisture proof material . . . is disposed over the surface of the crash attenuator . . . to prevent moisture from entering the interior."

U.S. Pat. No. 5,788,321 that issued to McHorse teaches "a vehicle having a side-mounted fairing for reducing aerodynamic drag . . . [and] a portion of the fairing is easily removable to allow access to vehicle components . . . . The removable fairing includes a convolute sheet of substantially rigid material in which planar surfaces are formed for providing steps. Support rails are mounted to an inner surface of the fairing just below the steps to connect the fairing to the vehicle and to support weight placed on the steps. The rails include mortise and tenon connections for connecting the removable fairing portion to a fixed portion of the fairing. In addition, support brackets are fixedly attached to the vehicle and extend outward to provide support for the removable fairing. Fasteners are provided for securing the removable fairing to the vehicle and to the fixed portion of the fairing."

U.S. Pat. No. 5,921,617 that issued to Loewen teaches "a fairing attachable beneath a lower, outer longitudinal edge of a trailer. The fairing has longitudinally extending forward and rearward sections. The rearward section can be moved longitudinally to adjustably locate its rearward edge in a selected position forward of the trailer's wheel assembly. Such adjustable positioning occurs automatically if the rearward section is coupled to and longitudinally movable with the support frame for the trailer's wheel assembly, thus maintaining the rearward edge of the fairing in the selected position whenever the trailer's wheel assembly is longitudinally adjusted relative to the trailer. A hinge mechanism coupled between the trailer and the fairing allows pivotal displacement of each fairing section between lowered and raised positions. The lowered position is for long distance haulage of the trailer in order to achieve fuel economy. The raised position is for situations in which the trailer must be maneuvered over ramps, uneven terrain, etc. which might contact the underside of or otherwise interfere with the fairing."

U.S. Pat. No. 6,213,540 that issued to Tusim teaches "an energy absorbing article . . . formed of extruded thermoplastic foam . . . [that exhibits high] anisotropic compressive strength. The extrusion direction of the thermoplastic foam is aligned substantially parallel with the direction in which impact resistance is desired to provide an energy absorbing article exhibiting a high ratio of compressive strength to weight."

U.S. Pat. No. 6,450,556 that issued to Jacobs teaches "an external vehicle airbag system . . . , a method of its use and a principal vehicle . . . on which it is mounted [that] involves mounting an airbag . . . at a bottom side . . . of the principal vehicle at a position spaced substantially laterally inwardly from a lateral-side periphery . . . of the principal vehicle. Also involved is a sensor . . . for being mounted on the principal vehicle at a position more laterally outwardly, in a direction toward the lateral-side periphery, than is the airbag. The sensor senses a collision of the principal vehicle with a colliding vehicle and, in response thereto, inflates the airbag below the principal vehicle, along the bottom thereof toward the lateral-side periphery, to thereby absorb energy from the colliding vehicle and prevent under-riding. In one embodiment, the sensor is positioned approximately at the lateral-side periphery and it can be mounted on a rigid under-ride guard."

U.S. Pat. No. 6,974,178 that issued to Ortega teaches "an apparatus for reducing the aerodynamic drag of a wheeled vehicle in a flowstream, the vehicle having a vehicle body and a wheel assembly supporting the vehicle body. The apparatus includes a baffle assembly adapted to be positioned upstream of the wheel assembly for deflecting airflow away from the wheel assembly so as to reduce the incident pressure on the wheel assembly."

U.S. Pat. No. 7,093,889 that issued to Graham teaches "a device for reducing vehicle aerodynamic resistance for vehicles having a generally rectangular body disposed above rear wheels . . . [The device] comprising a plurality of load bearing struts attached to the bottom of the rectangular body adjacent its sides, a plurality of opposing flat sheets attached to the load bearing struts, and angled flaps attached to the lower edge of the opposing sheets defining an obtuse angle with the opposing flat sheets extending inwardly with respect to the sides of the rectangular body to a predetermined height above the ground, which, stiffen the opposing flat sheets, bend to resist damage when struck by the ground, and guide airflow around the rear wheels of the vehicle to reduce its aerodynamic resistance when moving."

German Patent Application Publication No. DE4142804 that issued to Eble teaches a "bottom part of the vehicle, between the wheels, . . . [that] is fitted with a tubular frame . . . to which are clipped side panels . . . . These protect pedestrians etc. from running under the vehicle . . . . The panels are removable to access storage lockers, spare wheels etc. The tubular frames . . . have horizontal rails . . . along which the panels can slide. The panels are fitted via clips . . . . The upper mounting can be flexible . . . to enable the panels to be swung up for access to the chassis."

British Patent Application Publication No. GB2172556 that issued to Brown teaches "a sideguard assembly for a commercial vehicle . . . [The sideguard assembly] has a side rail assembly consisting of two parallel spaced apart side rails . . . secured together at one end by a vertical post . . . extending therebetween, the assembly being releasably connected to one or more brackets . . . which in turn are connected to the cross members . . . on the vehicles chassis. The position of connection of the side rail assembly to the brackets is adjustable and the position of connection of the brackets to the vehicles cross members is also adjustable to suit different vehicles."

World Intelectual Proerty Organization Patent Application Publication No. WO2005115804 that issued to Ericksson teaches "an arrangement for a vehicle side underrun protection comprising at least one loadbearing member, which extends between the wheels or sets of wheels of the vehicle in the longitudinal direction thereof and basically along the outer contour of the vehicle, and which serves as side impact protection and/or protection to prevent unprotected road-users ending up under the vehicle. The side underrun protection . . . comprises at least one longitudinal section . . . suspended in at least two first brackets . . . fixed to the vehicle, along which brackets . . . at least one end of each individual section . . . of the side underrun protection . . . is vertically adjustable from at least a first, active position to a second, inactive position. The invention also relates to a vehicle provided with such a side underrun protection."

SUMMARY OF THE INVENTION

In accordance with the preferred embodiments of the present invention, some of the issues associated with trailer fairings, crash attenuators, and underride guards are overcome. An aerodynamic crash attenuating underride guard is presented.

The aerodynamic underride guard comprises an angled front section fore of the trailer landing gear, a crash attenuating middle section located between the trailer landing gear and the trailer wheel assembly, and an angled rear section located in proximity to the trailer wheel assembly. The front angled section deflects air away from the non-aerodynamic features of the trailer landing gear. The rear angled section deflects air away from the non-aerodynamic features of the trailer wheel assembly, and the crash attenuating middle section can prevent vehicles from under riding the trailer. The aerodynamic under ride guard may further comprise compartments for storing tires and other materials, doors for securing the compartments, and an access panel to the trailer landing gear.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a side view of an aerodynamic underride guard;

FIG. 4 is a bottom view of an aerodynamic underride guard;

FIG. 5 is a perspective view of a rounded an aerodynamic underride guard;

FIG. 8 is a bottom perspective view of an aerodynamic underride guard that has portions between the trailer landing gear and wheel assembly that have less height and width than the non-retractable portions of the trailer landing gear;

FIG. 9 is a bottom view of an aerodynamic underride guard that has portions between the trailer landing gear and wheel assembly that have less height and width than the non-retractable portions of the trailer landing gear;

FIG. 11 is a side view of an aerodynamic underride guard that has portions between the trailer landing gear and wheel assembly that have less height and width than the non-retractable portions of the trailer landing gear;

FIG. 12 is a side perspective view of an aerodynamic underride guard that has portions between the trailer landing gear and wheel assembly with less height and width than the non-retractable portions of the trailer landing gear;

FIG. 19 is a top perspective of an aerodynamic underride guard that does not have portions between the trailer landing gear and wheel assembly with less width and height than the non-retractable portions of the landing gear;

FIG. 20 is a top view of an aerodynamic underride guard with crash attenuating internal structures;

FIG. 36 is a sectional view of an aerodynamic underride guard with two regions having crash attenuating foam;

DETAILED DESCRIPTION OF THE INVENTION

Figure 1:
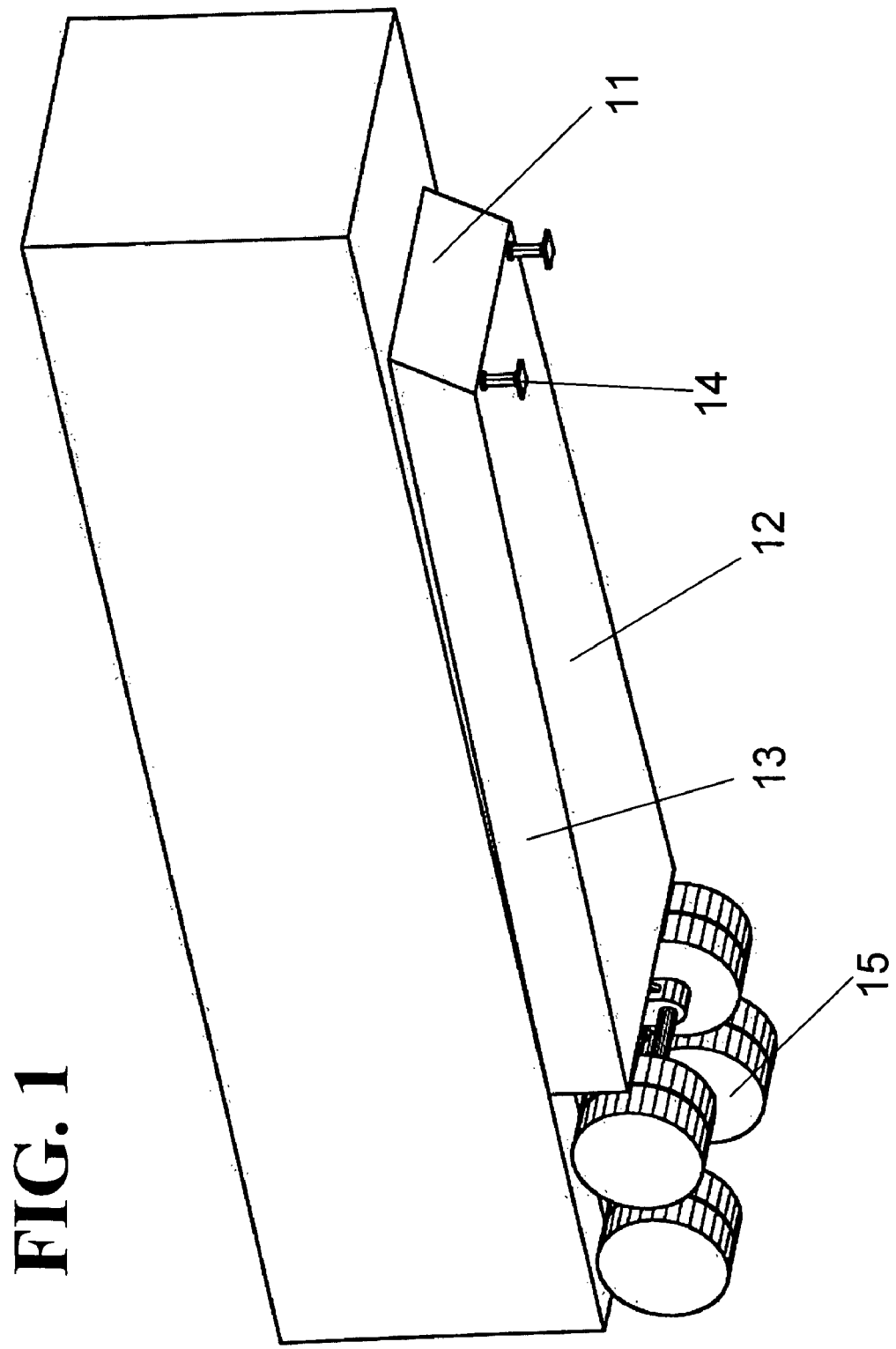
FIG. 1 is a bottom perspective view of an aerodynamic underride guard.
Figure 2:
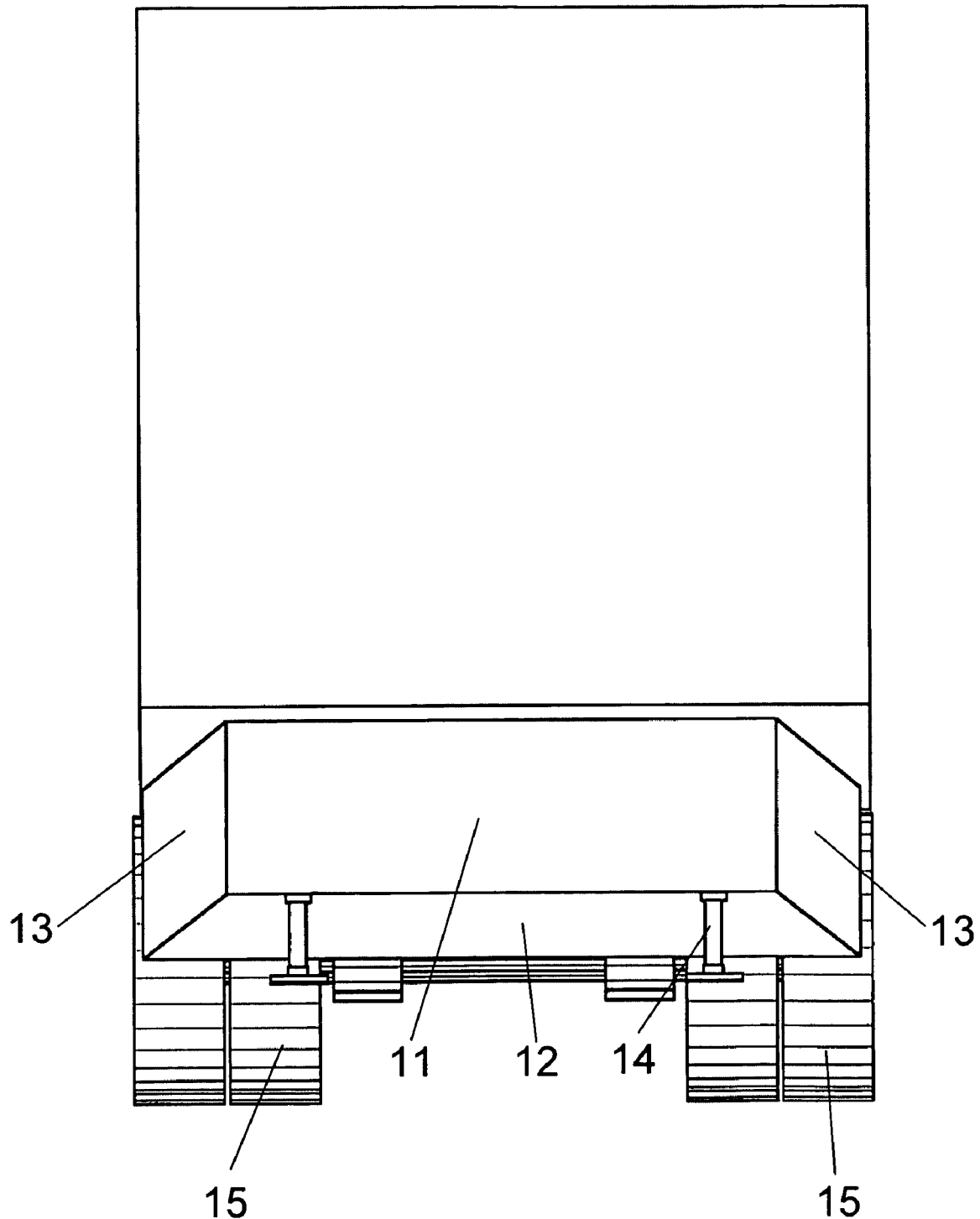
FIG. 2 is a front view of an aerodynamic underride guard.

Referring to the figures, exemplary embodiments of the invention will now be described. The exemplary embodiments are provided to illustrate aspects of the invention and should not be construed as limiting the scope of the invention. The exemplary embodiments are primarily described with reference to the figures.

FIGS. 1, 2, 3, and 4 respectively illustrate a bottom perspective view, front view, side view, and bottom view of an aerodynamic underride guard. The aerodynamic underride guard comprises a front angled surface 11, a bottom surface 12, and two side surfaces 13 or sidewalls. In one exemplary embodiment of the invention, the slope of the front angled surface is generally defined by the angle of the trailer landing gear structural supports. The two side surfaces may be tapered so that their height is less near the trailer landing gear 14 than near the wheel assembly 15. The bottom surface may be tapered so that its width is less in regions near the trailer landing gear than in regions near the wheel assembly. The volume between the two side surfaces may include crash attenuating structures and/or crash attenuating foam. Alternate embodiments of the invention may utilize a plurality of front angled surfaces that are angled both down and laterally away from the trailer landing gear. In an exemplary embodiment of the invention, the front angled surface is located between the trailer landing gear assembly 14 and the kingpin 30 used to connect the trailer to a tractor.

The front surface of the aerodynamic underride guard is not limited to a single angular surface. All the structures disclosed in U.S. patent application Ser. No. 12/128,809 titled "Trailer Keel" by Mark Roush and Keith Wallace of Lafayette, Ind. are hereby incorporated by reference.

The aerodynamic underride guard reduces aerodynamic drag by directing air flow in a manner which reduces the relatively positive air pressure ahead of the trailer and the relatively negative air pressure behind the trailer. In addition to improving the aerodynamic characteristics of the landing gear, the underride guard can reduce the amount of spray and debris in a moving trailer's wake.

The aerodynamic underride guard will likely be subjected to dirt, rain, gasoline, diesel fuel, salt, and a variety of other materials commonly found along roadways. The outer shell of the aerodynamic underride guard must be constructed with a resilient material capable of withstanding roadway debris for the life of the trailer. Such materials capable of withstanding roadway debris include aluminum, painted aluminum, galvanized steel diamond plate, other galvanized metals, polypropylene, other lightweight rigid plastics, composites, and resins.

Figure 6:
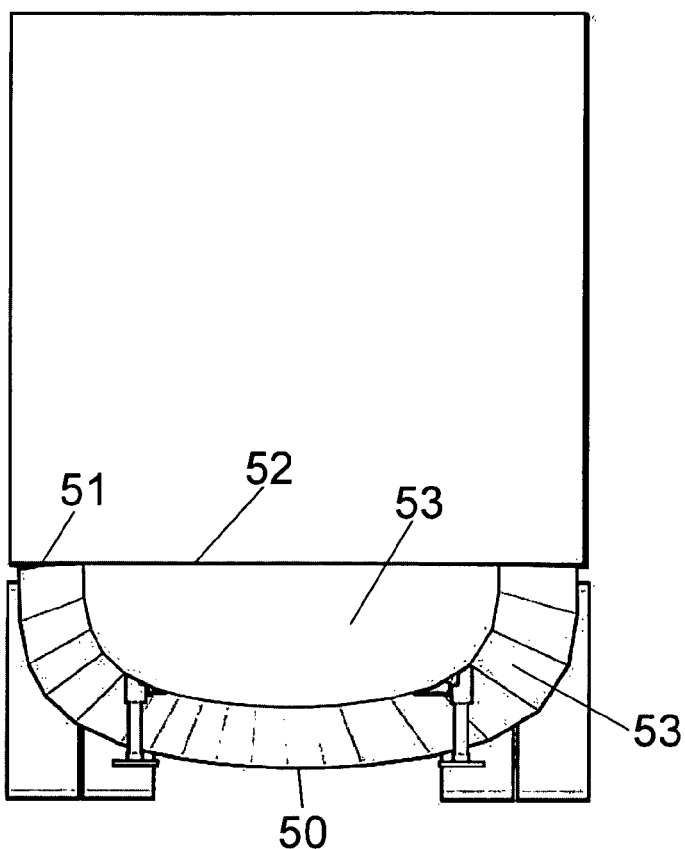
FIG. 6 is a front view of a rounded an aerodynamic underride guard.
Figure 7:
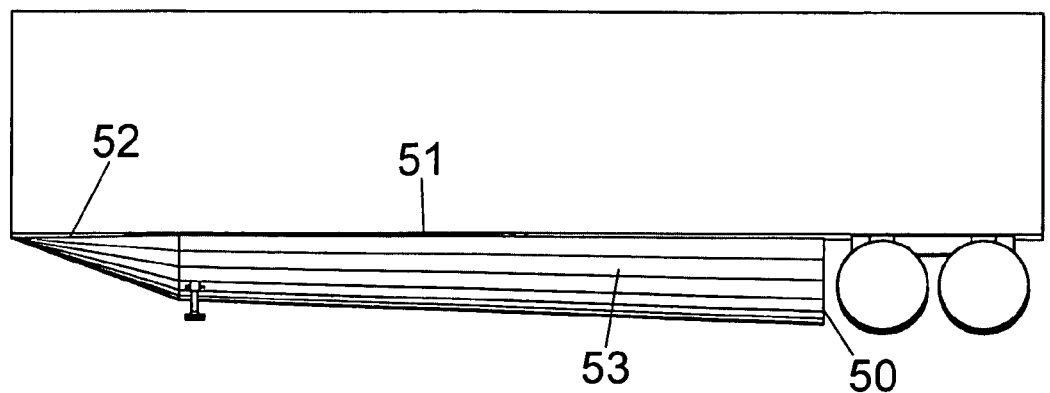
FIG. 7 is a side view of a rounded an aerodynamic underride guard.
Figure 10:
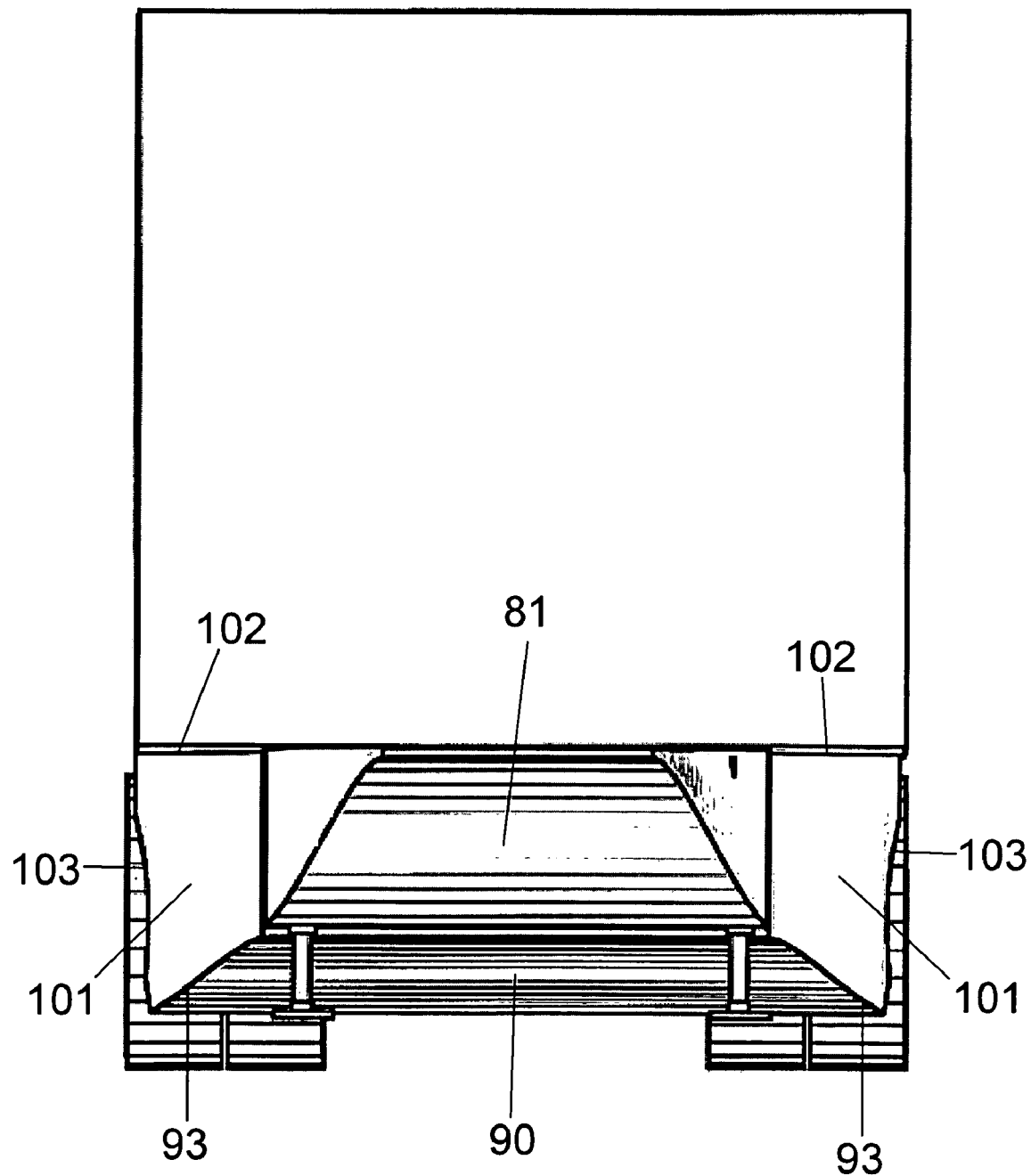
FIG. 10 is a front view of an aerodynamic underride guard that has portions between the trailer landing gear and wheel assembly that have less height and width than the non-retractable portions of the trailer landing gear.

FIGS. 5, 6, and 7 respectively illustrate a side perspective view, front view, and side view of a rounded aerodynamic underride guard. The rounded aerodynamic underride guard includes a rounded rear trailing edge 50 in a region near the wheel assembly, two top side edges 51, two front angled edges 52, and a surface 53 generally defined by the rear trailing edge, the side edges, and the front angled edges. The ends of the rear side edges are generally connected to one end of the top side edges. The other ends of the top side edges 51 are connected to an end of the fore angled edges 52, and the two fore angled edges 52 are connected to each other.

FIGS. 8, 9, 10, 11, and 12 respectively illustrate a bottom perspective view, bottom view, front view, side view, and side perspective view of an aerodynamic underride guard that has portions between the landing gear and wheel assembly that have less height and width than the non-retractable portions of the trailer landing gear. The aerodynamic underride guard includes a fore section, a middle section, and an aft section.

The aerodynamic underride guard has a fore section with a front tapered s-curved surface 81 that includes a surface with an s-curve shape, a back tapered s-curved surface 82 that includes a face with an s-curve shape, and two side pieces 83 that connect to the front tapered and back tapered s-curved surfaces. The aerodynamic underride guard substantially encloses the non-retractable portions of a landing gear assembly. The front and back s-curved piece of the aerodynamic underride guard are tapered so that the leading and trailing edges of the fore section are shorter than the separation distance between the outermost surfaces of the trailer landing gears. In another embodiment of the invention, the front tapered s-curved surface is substantially tapered so that the leading edge of the underride guard is substantially point-like.

The two sides pieces 83 and back tapered s-curved surface 82 of the fore section are respectively connected to two sides pieces 84 and a bottom piece 85 of a middle section of the aerodynamic underride guard.

The aft section of the aerodynamic underride guard includes an aft bottom surface 90 defined by a leading straight edge 91 (connected to the bottom piece of the middle section), a trailing straight edge 92, and two curved side edges 93. Each end of the leading straight edge 91 and trailing straight edge 92 is connected to a curved side edge 93. The curved side edges 93 include the general shape of an s-curve. The aft bottom surface 90 is connected to the bottom piece 85 of the middle section of the aerodynamic underride guard. The aft section further includes at least one side surface 101 defined by a horizontal straight edge 102, a vertical curved edge 103, a curved side edge of the aft bottom surface 93, and an edge of a side piece of the middle section. The vertical curved edge 103 is connected to both the horizontal straight edge 102 and trailing straight edge 92. The vertical curved edge shown includes a curvature similar to that of a wheel. The side surfaces 101 of the aft section are connected to the side pieces 84 of the middle section of the aerodynamic underride guard.

Figure 13:
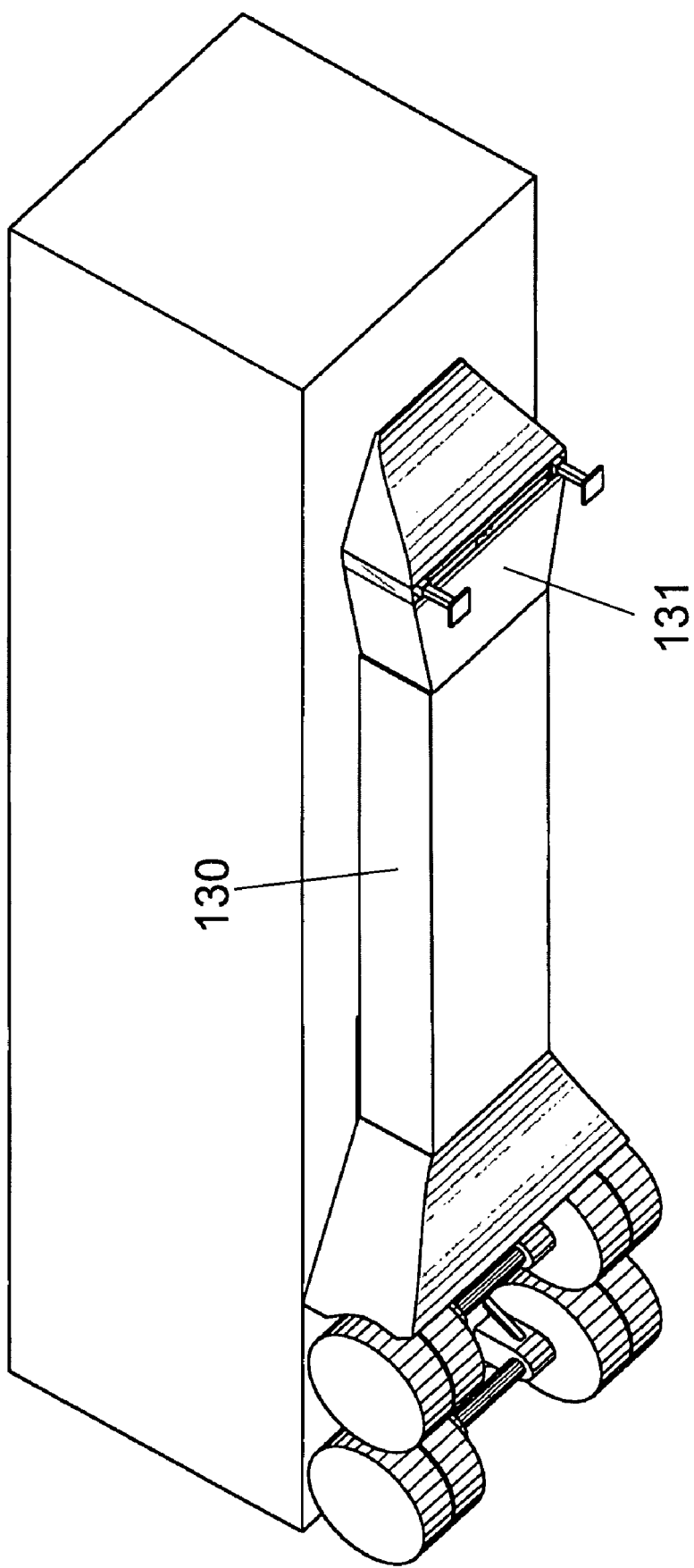
FIG. 13 is a bottom perspective view of an aerodynamic underride guard that has portions between the trailer landing gear and wheel assembly that have less width than the non-retractable portions of the trailer landing gear.
Figure 14:
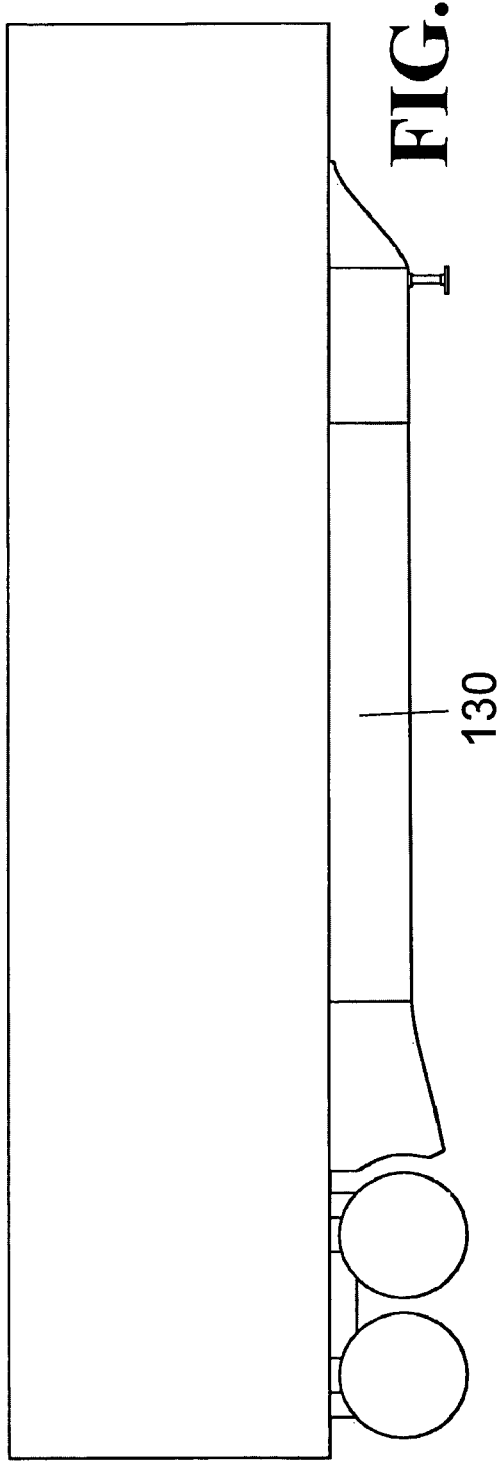
FIG. 14 a side view of an aerodynamic underride guard that has portions between the landing gear and wheel assembly with less width than the non-retractable portions of the trailer landing gear.
Figure 15:
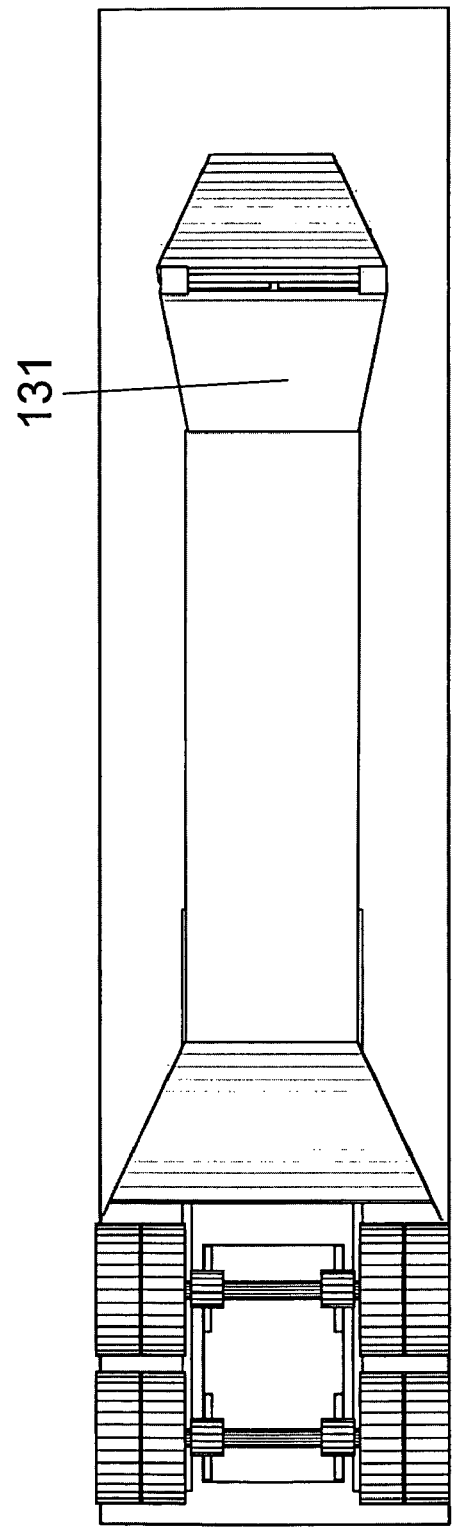
FIG. 15 is a bottom view of an aerodynamic underride guard that has portions between the trailer landing gear and wheel assembly with less width than the non-retractable portions of the trailer landing gear.
Figure 16:
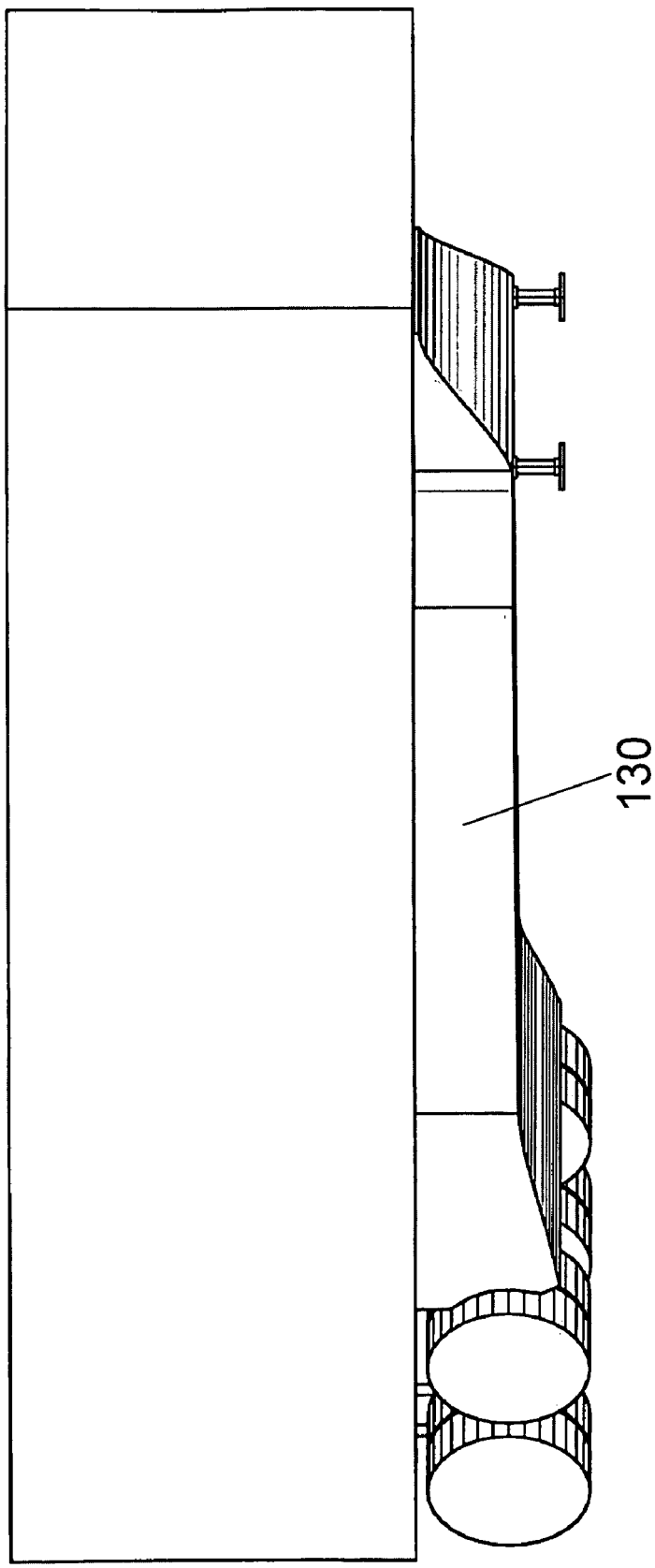
FIG. 16 is a side perspective view of an aerodynamic underride guard that does not have portions between the trailer landing gear and wheel assembly with less width and height than the non-retractable portions of the trailer landing gear.
Figure 17:
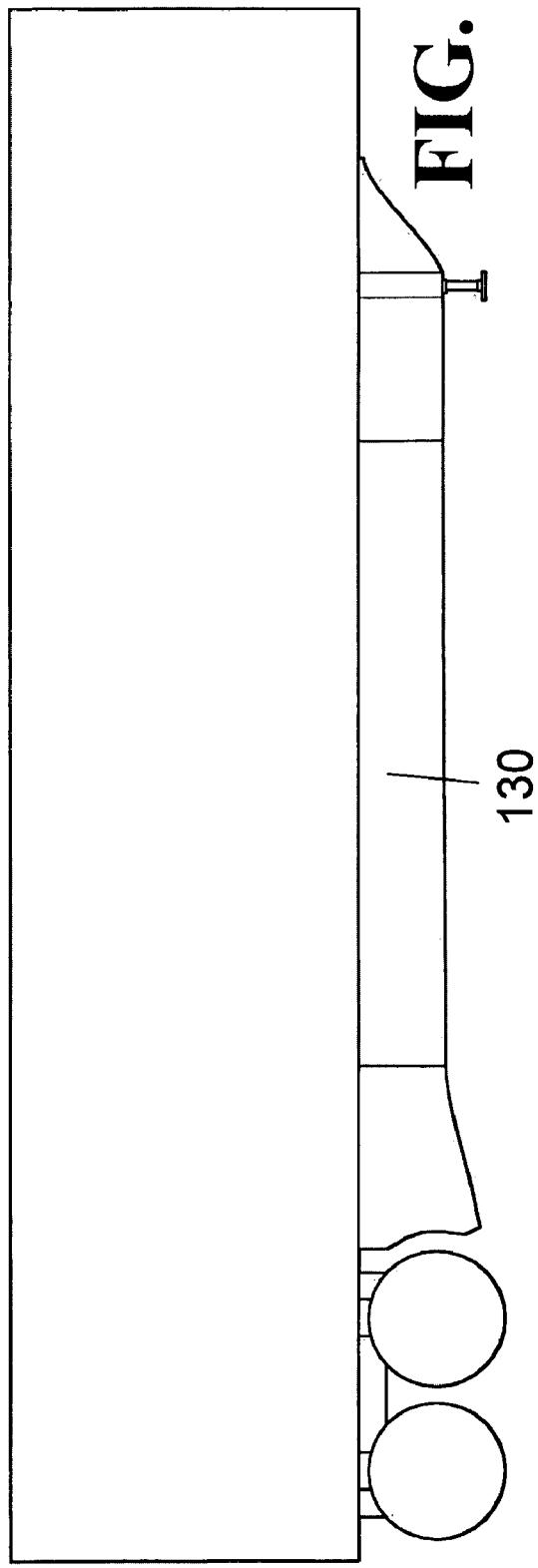
FIG. 17 is a side view of an aerodynamic underride guard that does not have portions between the trailer landing gear and wheel assembly with less width and height than the non-retractable portions of the trailer landing gear.
Figure 18:
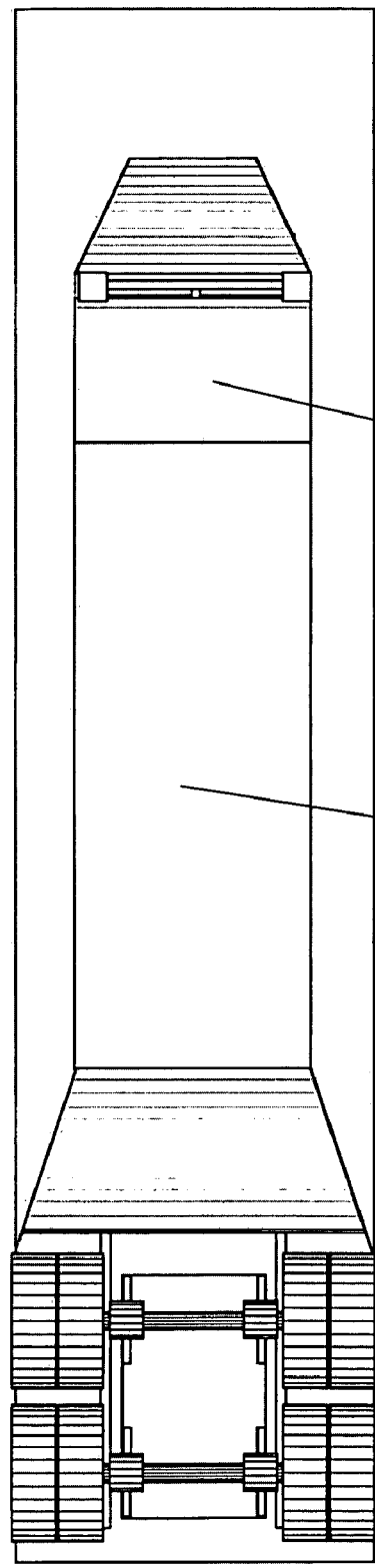
FIG. 18 is a bottom view of an aerodynamic underride guard that does not have portions between the trailer landing gear and wheel assembly with less width and height than the non-retractable portions of the trailer landing gear.
Figure 21:
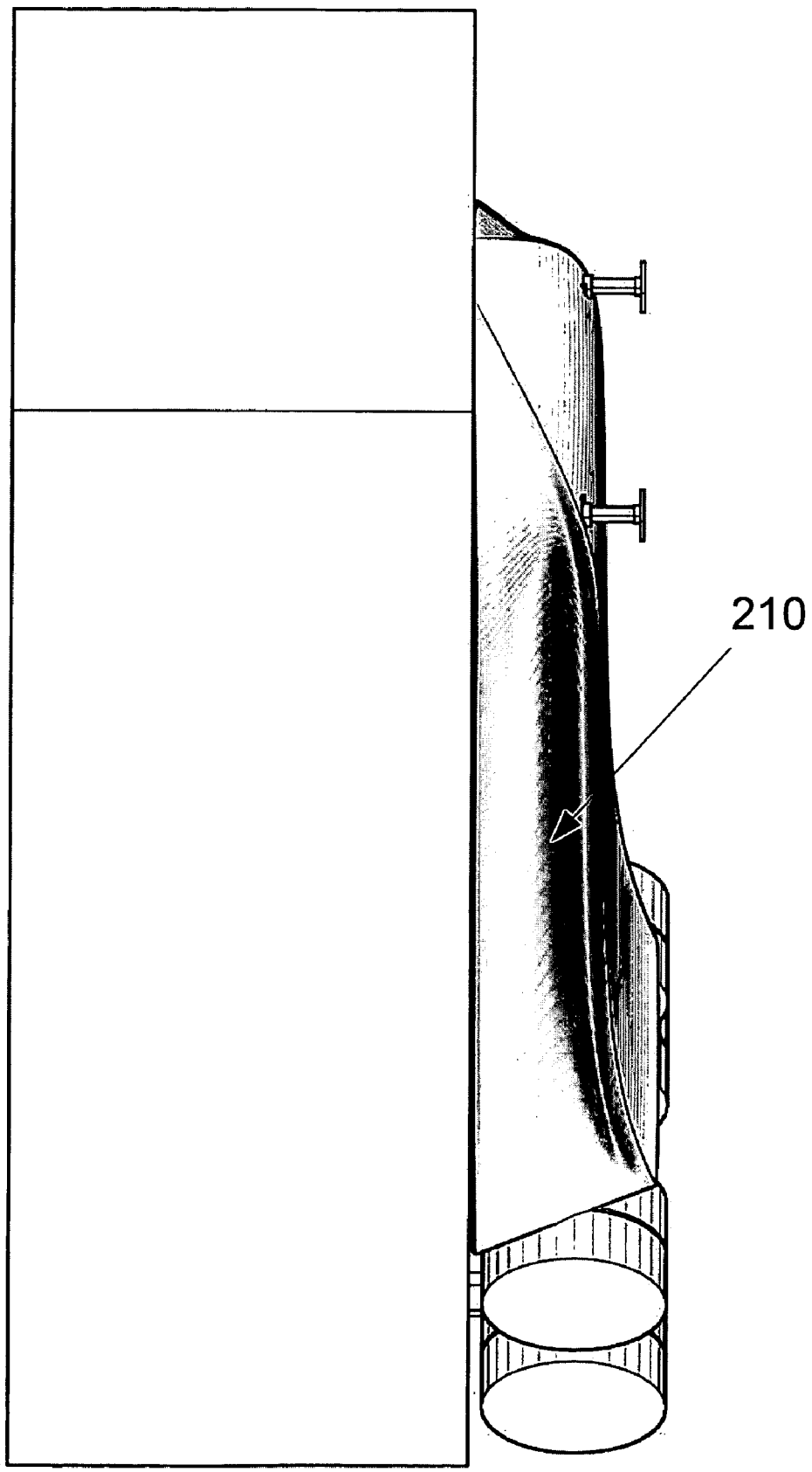
FIG. 21 is a side perspective view of a highly curved aerodynamic underride guard.
Figure 22:
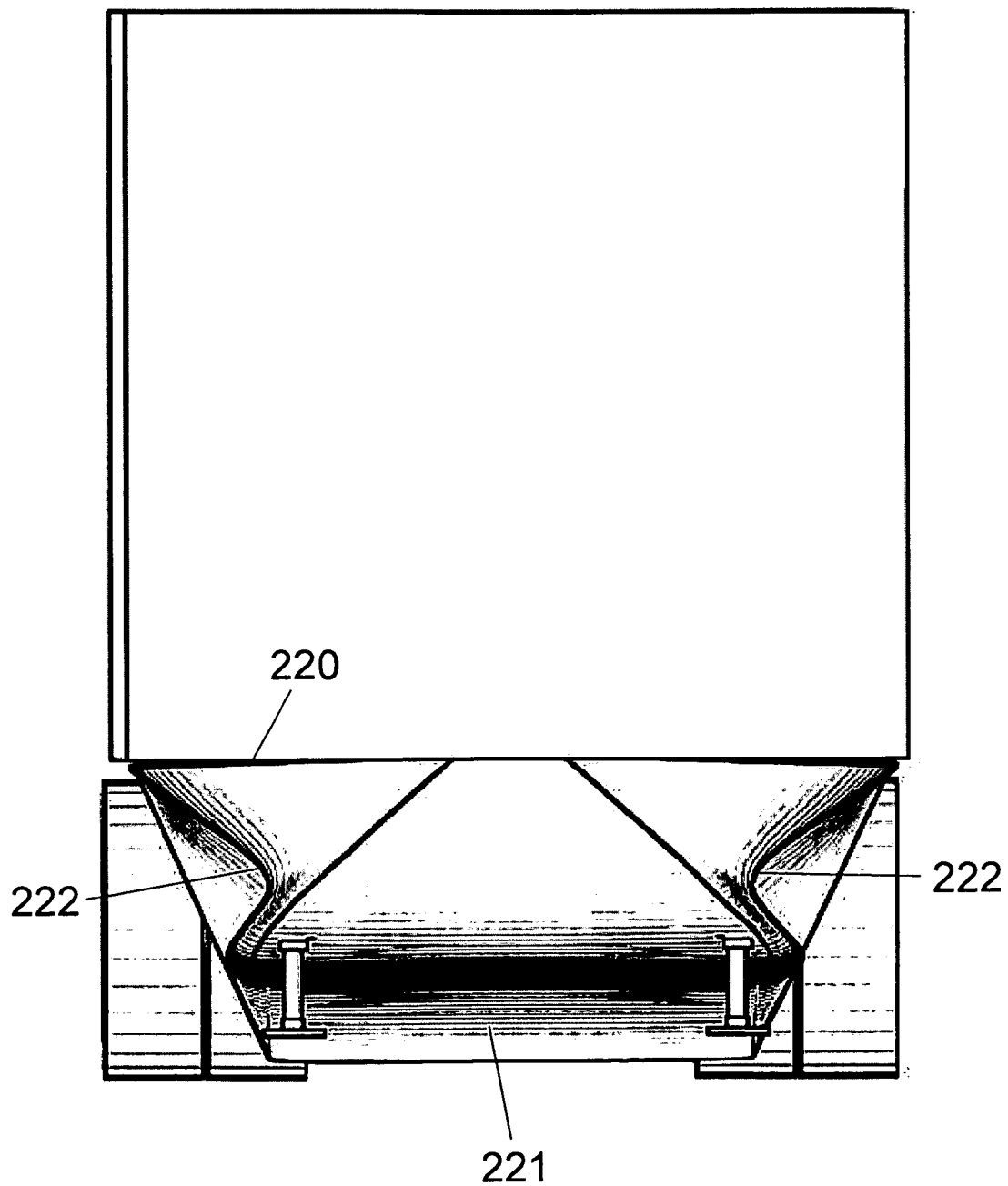
FIG. 22 is a front view of a highly curved aerodynamic underride guard.
Figure 23:
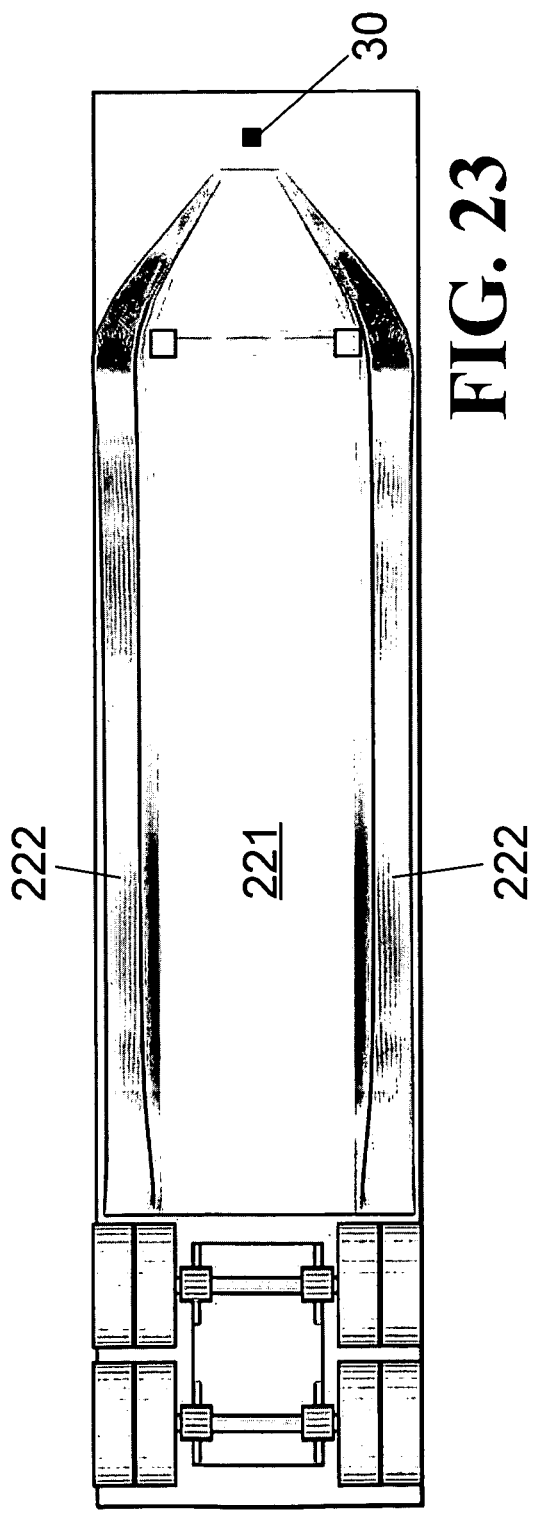
FIG. 23 is a bottom view of a highly curved aerodynamic underride guard.
Figure 24:
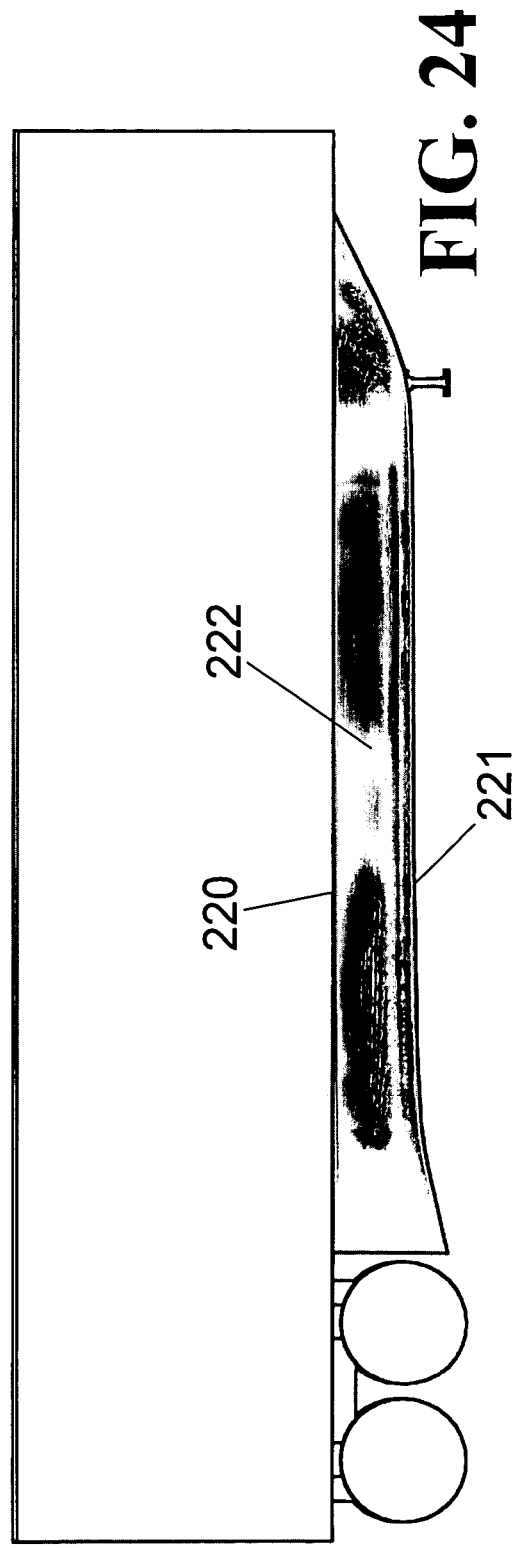
FIG. 24 is a side view of a highly curved aerodynamic underride guard.
Figure 25:
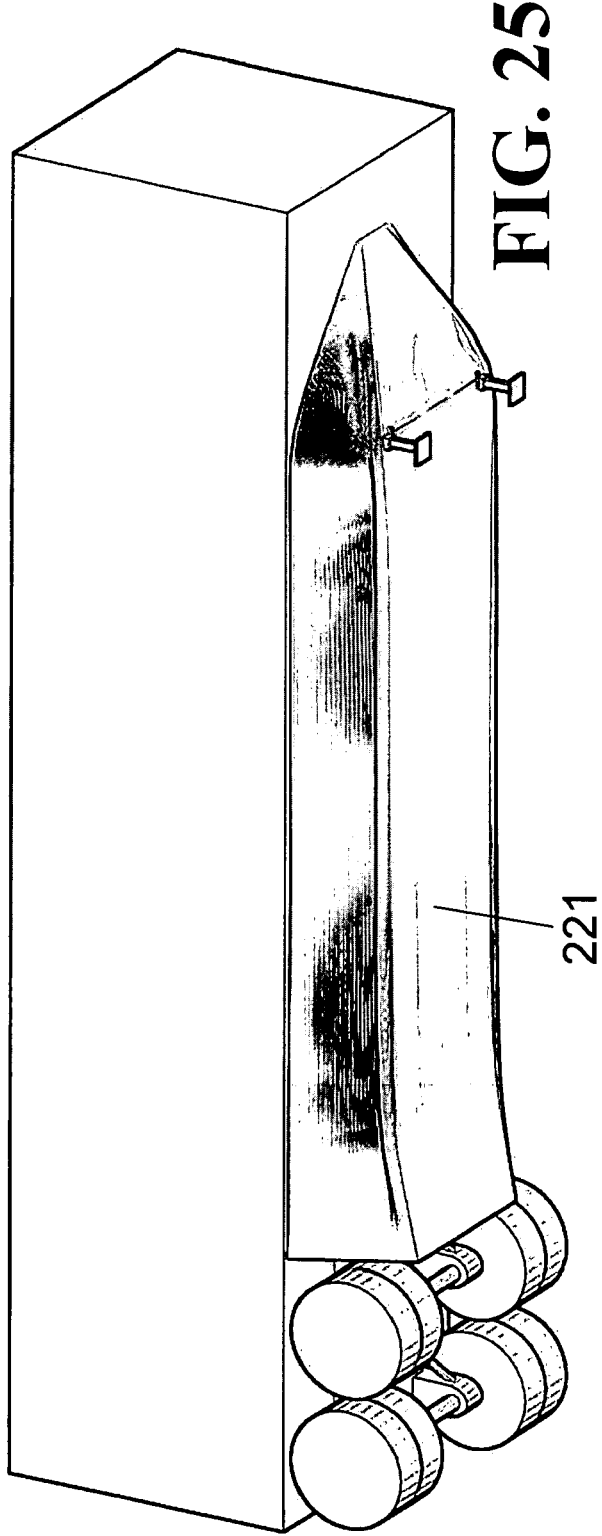
FIG. 25 is a bottom perspective view of a highly curved aerodynamic underride guard.
Figure 26:
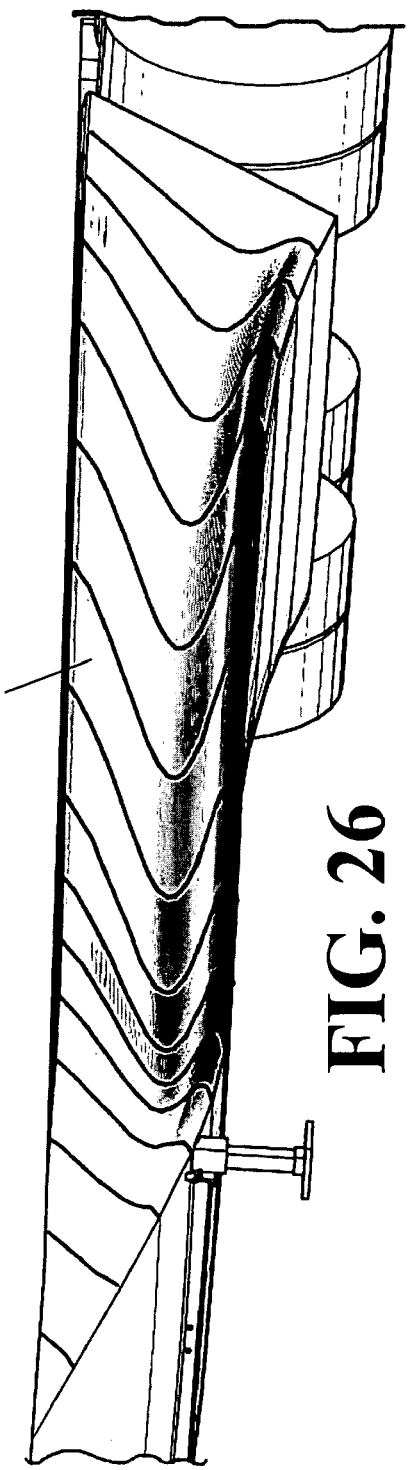
FIG. 26 is a partial side perspective view of a highly curved aerodynamic underride guard.

FIGS. 13, 14, and 15 respectively illustrate a bottom perspective view, side view, and bottom view of an aerodynamic underride guard. The stretched side pieces 130 of the middle section of the aerodynamic underride guard have heights that are comparable to the height of the non-retractable portions of the trailer landing gear. The back tapered surface 131 of the fore section does not include an edge that is substantially s-curved. The aerodynamic underride guard illustrated in FIGS. 13, 14, and 15 has a middle section that is lower than the embodiment illustrated in FIGS. 8, 9, 10, 11, and 12. As a result of the lower middle section, the underride guard will be better able to prevent smaller vehicles from under ridding the trailer. The embodiment shown in FIGS. 8-12 has smaller side pieces in the middle section and therefore will weigh less than the embodiment shown in FIGS. 13-15.

FIGS. 16, 17, 18, 19, and 20 respectively illustrate a side perspective view, side view, bottom view, top perspective view, and top view of an aerodynamic underride guard. The stretched side pieces 130 of the middle section of the aerodynamic underride guard have heights that are comparable to the height of the non-retractable portions of the trailer landing gear. The non-retractable portions of the landing gear include a plurality receivers adapted for moving a plurality of landing gear legs, vertical, horizontal, and angled structural supports. Referring to U.S. patent application Ser. No. 12/128,809, herein incorporated by reference, FIG. 75 shows non-retractable portions include gusset plates 750, receivers 751, crank assemblies located near 755, and landing gear structural supports such as a fore angled stabilizer rod 14 or the oppositely oriented aft angled stabilizer rod, while the retractable portions include the movable landing gear legs 16. The stretched bottom piece 180 of the middle section has a width comparable to the width of the non-retractable portions of the landing gear. The back surface 181 of the fore section is not tapered and does not include an edge that is substantially s-curved. The embodiment illustrated in FIGS. 16-20 will be larger and weigh more than the embodiments illustrated in FIGS. 8-15. Compared to the embodiment of FIGS. 8-15, the embodiment of FIGS. 16-20 will be better able to prevent a vehicle from under riding the trailer.

FIG. 20 illustrates an embodiment of the invention with resilient support structures 200, or elongated impact members, between the trailer landing gear 14 and the wheel assembly 15. In one exemplary embodiment of the invention, the resilient support structures are comprised of a single reinforced piece of metal or polymer and function primarily to prevent vehicles from under ridding the trailer, while the remainder of the aerodynamic underride guard functions primarily to improve the aerodynamics of the trailer. The elongated impact members may be connected to the bottom of a cargo container by a network of impact absorbing structures/supports such as those shown in FIGS. 32-44.

FIGS. 21, 22, 23, 24, 25, and 26 respectively illustrate a side perspective view, front bottom view, side view, bottom perspective view, and partial view of a highly curved aerodynamic underride guard 210. The highly curved aerodynamic underride guard includes a curved surface with a cross section that has a top edge 220, a bottom edge 221, and two curved side edges 222 between the top and bottom edge. Each curved side edge has at least one convex section and at least one concave section. In the exemplary embodiment illustrated, each curved side edge has two concave sections and a convex section.

The embodiment of the invention shown in FIGS. 21-26 has fewer edges than the embodiment illustrated in FIGS. 16-20. The curved surface of FIGS. 21-26 is more streamlined than FIGS. 16-20, which results in less aerodynamic drag. The lower halves of the curved surface side portions shown in FIGS. 21-26 are curved inwards and the upper halves of the curved surface side portions shown in FIGS. 21-26 are curved outwards. The inward curvatures of the curved surface can decrease the total volume in the aerodynamic underride guard which can result in a lighter underride guard than shown FIGS. 16-20. In addition to potentially reducing the weight of the underride guard, the inward curvatures of the curved surface result in the bottom portion of the surface having an increased width which can better prevent vehicles from under riding the trailer.

Figure 27:
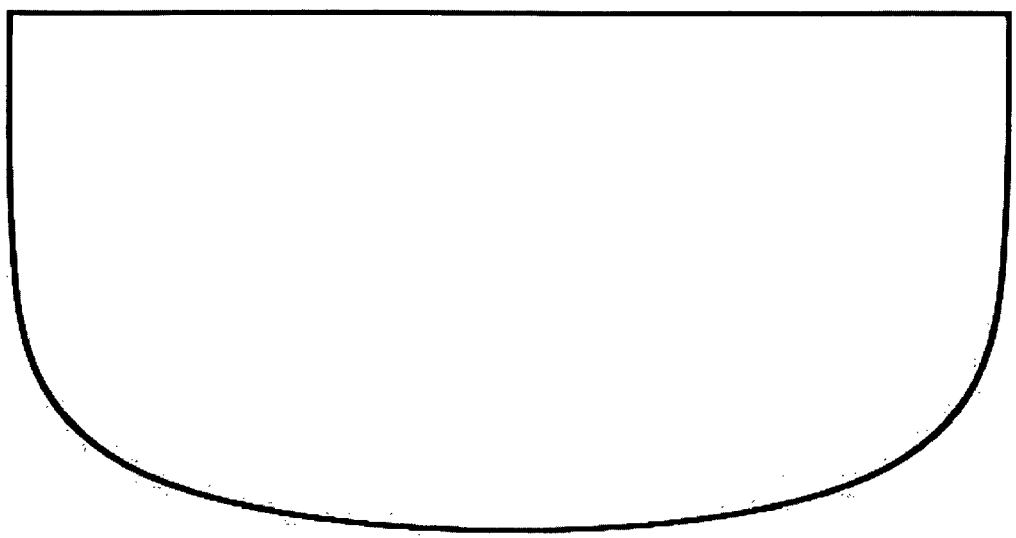
FIG. 27 is a sectional view of a rounded aerodynamic underride guard.
Figure 28:
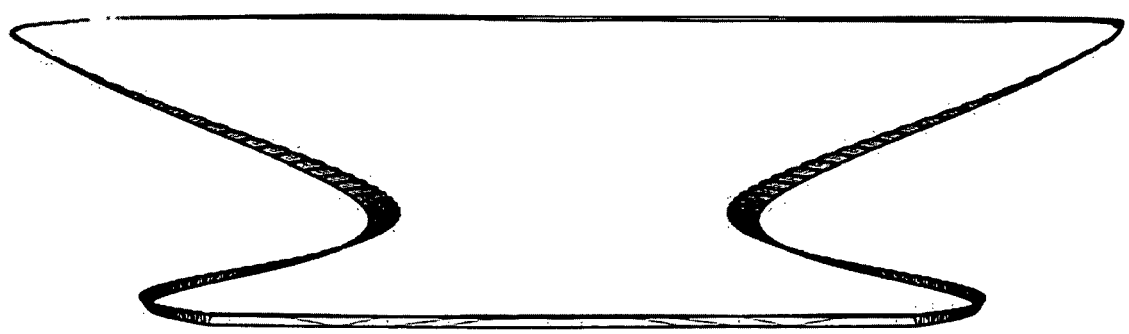
FIG. 28 is a sectional view of a highly curved aerodynamic underride guard.

FIGS. 27 and 28 respectively illustrate sectional views of a rounded and a highly curved aerodynamic underride guard, each without substantial crash attenuating features inside the area defined by the cross section. An underride guard with a hollow underride guard would be advantageous in that additional cargo could be transported in the underride guard. Transporting cargo inside of the underride guard would increase the potential carrying capacity of the trailer in addition to improving the crash attenuating properties of the underride guard by increasing the amount of material a vehicle would encounter upon impact.

Figure 29:
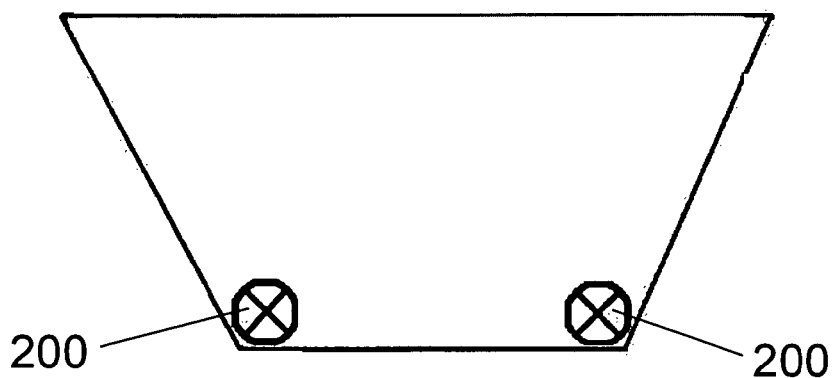
FIG. 29 is a sectional view of an aerodynamic underride guard with crash attenuating internal structures.
Figure 30:
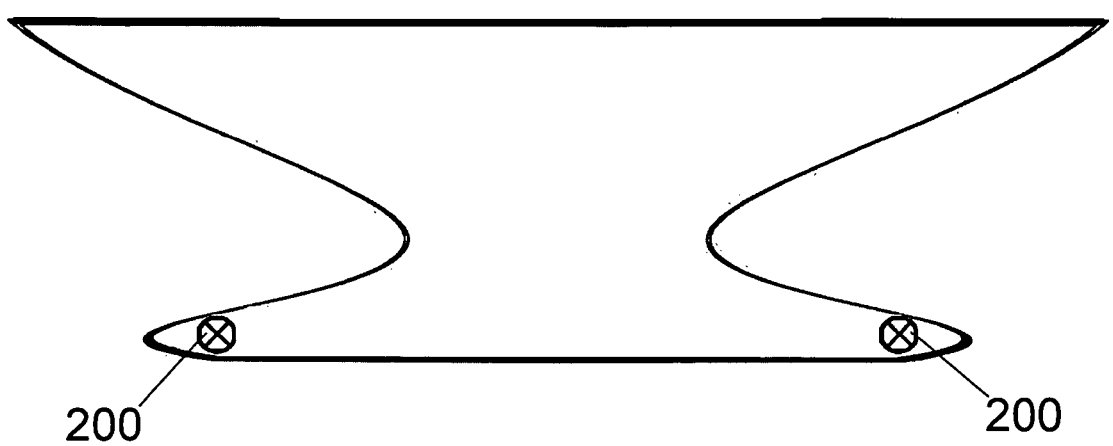
FIG. 30 is a sectional view of a highly curved aerodynamic underride guard with crash attenuating internal structures.

FIGS. 29 and 30 illustrate a sectional view of aerodynamic underride guards with crash attenuating resilient support structures 200 between the trailer landing gear and the wheel assembly. In the exemplary embodiments shown, the crash attenuating structures are in regions of the underride guard furthest away from the cargo container. Placement of crash attenuating structures farther away from the cargo container assists in preventing smaller vehicles from under riding the cargo container.

Figure 31:
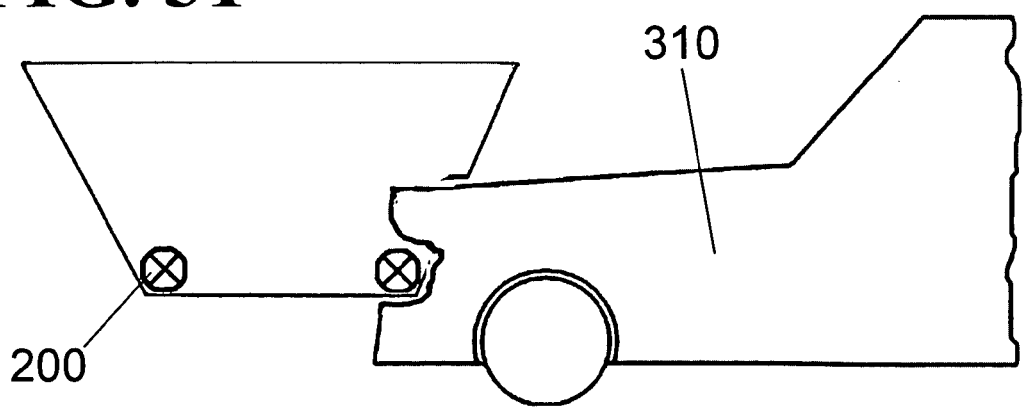
FIG. 31 is a sectional view of vehicle impacting an aerodynamic underride guard with crash attenuating internal structures.

FIG. 31 illustrates a view of a vehicle 310 impacting an aerodynamic underride guards with crash attenuating resilient support structures 200. The impact of the vehicle significantly deforms the aerodynamic outer shell of the underride guard; however the resilient support structures prevent the vehicle progressing through the underride guard.

Figure 32:
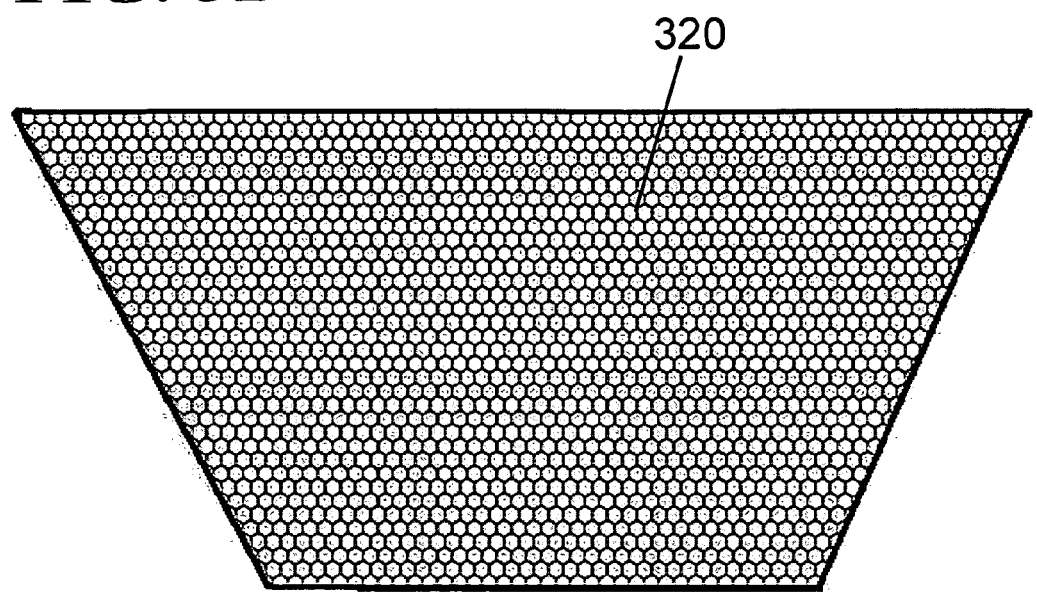
FIG. 32 is a sectional view of an aerodynamic underride guard with crash attenuating foam.

FIG. 32 illustrates a sectional view of an aerodynamic underride guard that includes crash attenuating foam 320. In the exemplary embodiment illustrated, the foam is in a honeycomb pattern. Crash attenuating foam can be made from many different materials including light weight cement, formed cellular aluminum, expanded polystyrene, expanded polypropylene, expanded polyurethane, beads of expanded polypropylene or polyethylene, plastic foam and various other fibrous materials.

Figure 33:
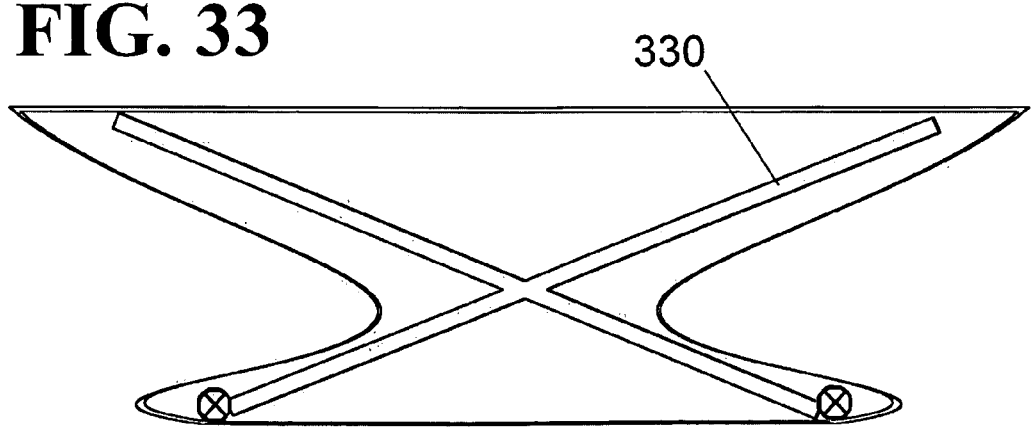
FIG. 33 is a sectional view of a highly curved aerodynamic underride guard with crash attenuating internal structures.

FIGS. 33 illustrate a sectional view of a highly aerodynamic underride guard with transverse structures 330. The transverse structures do not necessarily span the separation between the trailer landing gear and wheel assembly, instead the transverse structures are connected to the underside of the trailer. Connection of the structures inside the aerodynamic underride guard to the underside of the trailer allows for a greater range of structure designs to be utilized.

Figure 34:
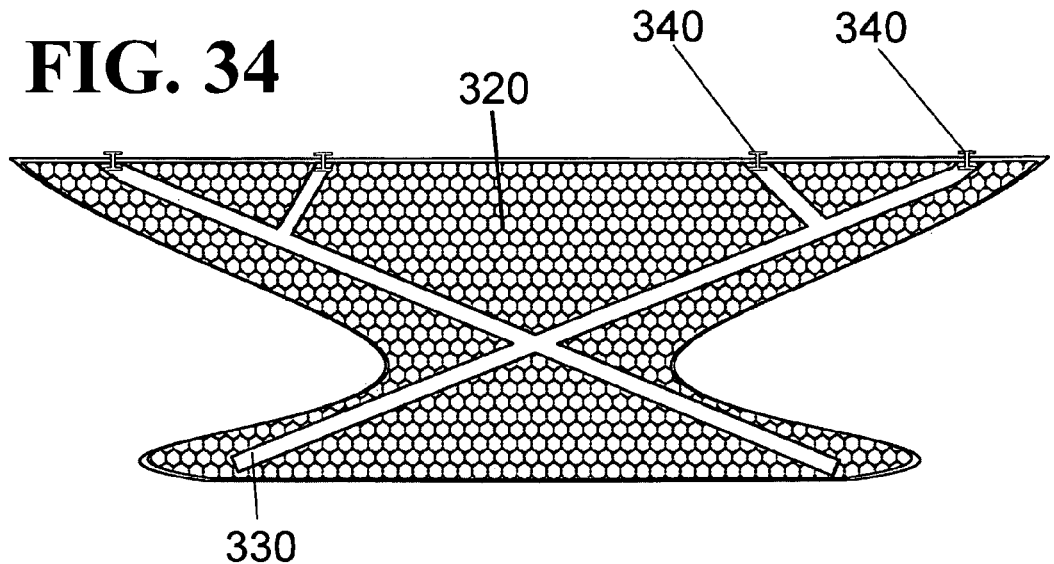
FIG. 34 is a sectional view of a highly curved aerodynamic underride guard with crash attenuating internal structures and foam.
Figure 35:
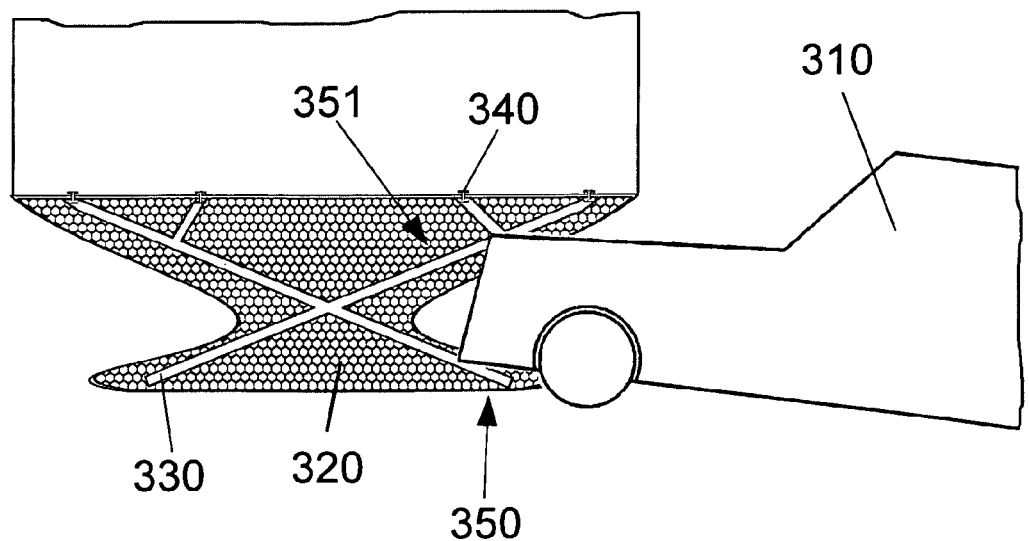
FIG. 35 is a sectional view of vehicle impacting a highly curved aerodynamic underride guard with crash attenuating internal structures and foam.

FIGS. 34 illustrates a sectional view of a highly aerodynamic underride guards with crash attenuating transverse structures 330 and crash attenuating foam 320. The transverse structures include an attachment means 340 for connecting to the underside of a trailer. Attachment means include screws, bolts, adhesives, and welds. FIG. 35 illustrates a vehicle 310 impacting the underride guard shown in FIG. 34. The lower portions of the underride guard 350 lift up the vehicle during the impact causing the vehicle to impact additional features in the in upper portion 351 of the underride guard to be impacted. Therefore the likelihood of the vehicle under ridding the trailer is reduced.

Figure 36:
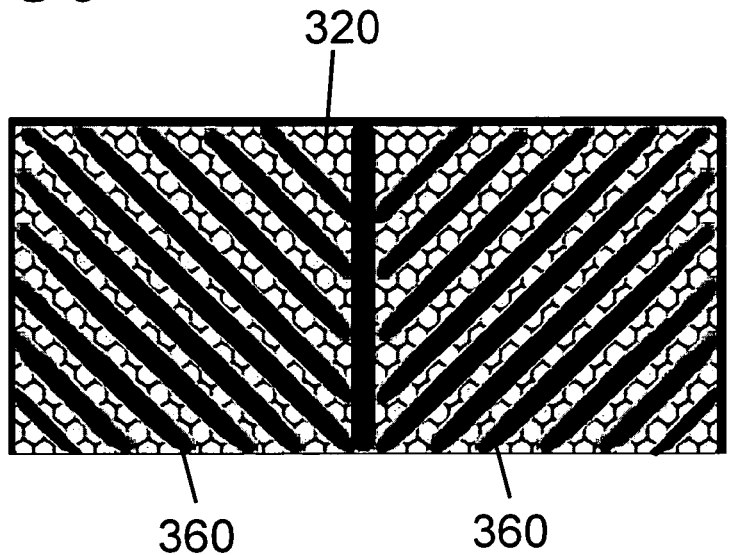
FIG. 36 is a sectional view of an aerodynamic underride guard with downward moving crash attenuating internal structures.
Figure 37:
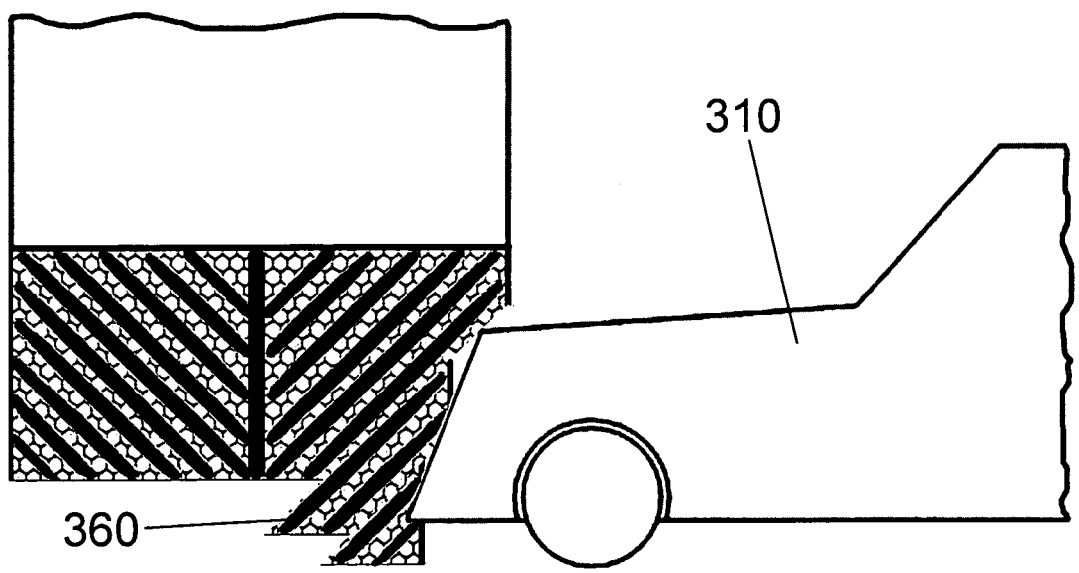
FIG. 37 is a sectional view of a vehicle impacting an aerodynamic underride guard with downward moving crash attenuating internal structures.

FIG. 36 illustrates an embodiment of the invention with crash attenuating foam 320 and downward moving structures 360 that move downward when impacted. The downward moving structures 360 may have roughed surfaces to pull material downward when underride guard is impacted. FIG. 37 illustrates a vehicle 310 impacting the underride guard shown in FIG. 36. The vehicle 310 impacting the underride guard shown in FIG. 37 causes the downward moving structures 360 to be forced downward into the path of the impacting vehicle 310. In addition to increased amounts of material in the path of the impacting vehicle, the resilient internal components may also be designed to dig into the surface on which the vehicle is traveling, thus further slowing down the vehicle. If a resilient internal component catches on the surface, the impacting vehicle may be forced upward further reducing the likelihood that the passenger cabin of the impacting vehicle will be compromised.

Figure 38:
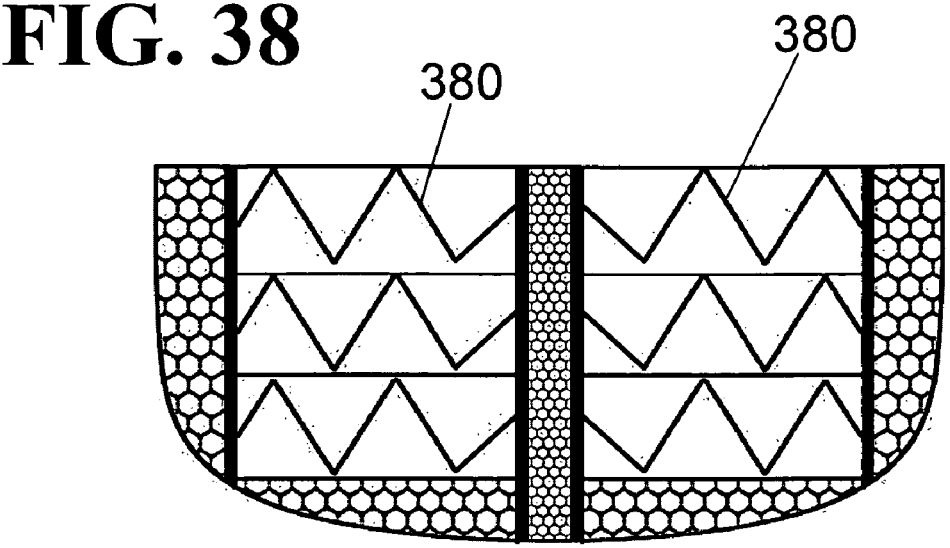
FIG. 38 is a sectional view of an aerodynamic underride guard with accordion type crash attenuating internal structures and foam.
Figure 39:
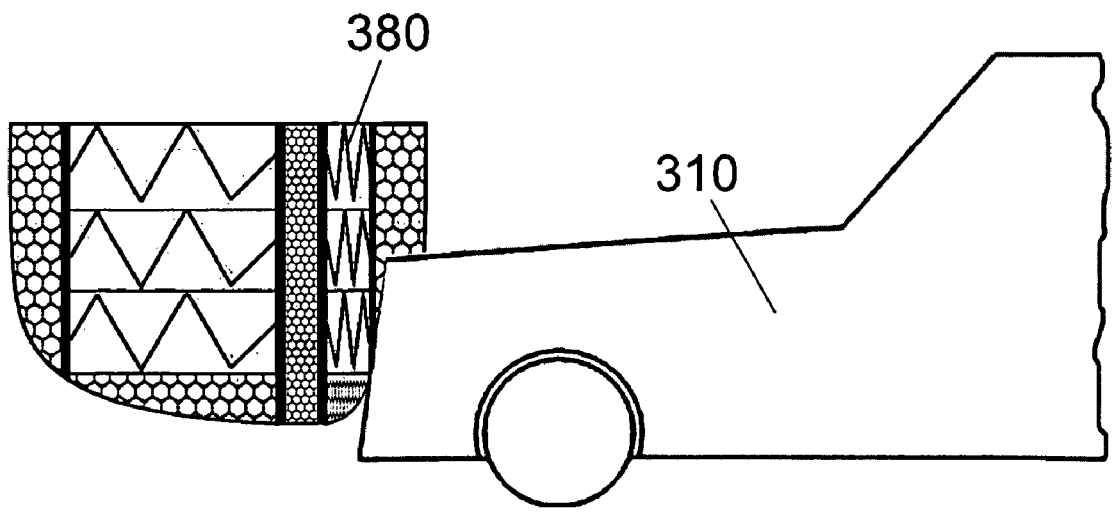
FIG. 39 is a sectional view of a vehicle impacting an aerodynamic underride guard with accordion type crash attenuating internal structures and foam.

FIG. 38 illustrates an embodiment of the invention with bendable features 380 that bend in a specific manner so as to absorb the impact of a vehicle that impacts the aerodynamic underride guard. FIG. 39 illustrates a vehicle 310 impacting the underride guard of shown in FIG. 38. The bendable features 380 of the impacted underride guard collapsed to absorb some of the impact of the vehicle.

Figure 40:
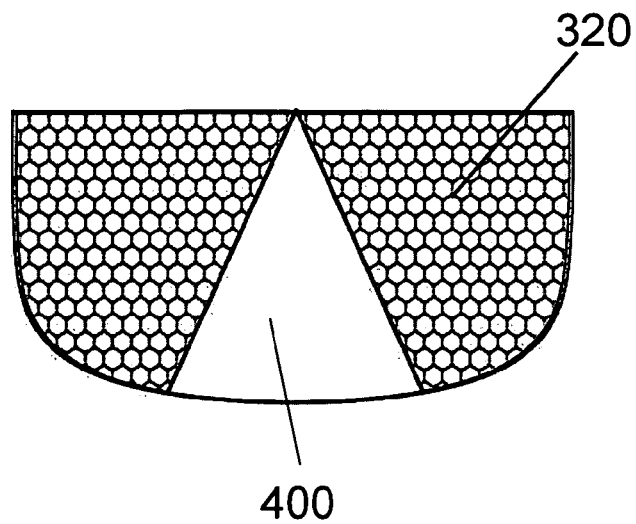
FIG. 40 is a sectional view of an aerodynamic underride guard with three regions having crash attenuating foam.
Figure 41:
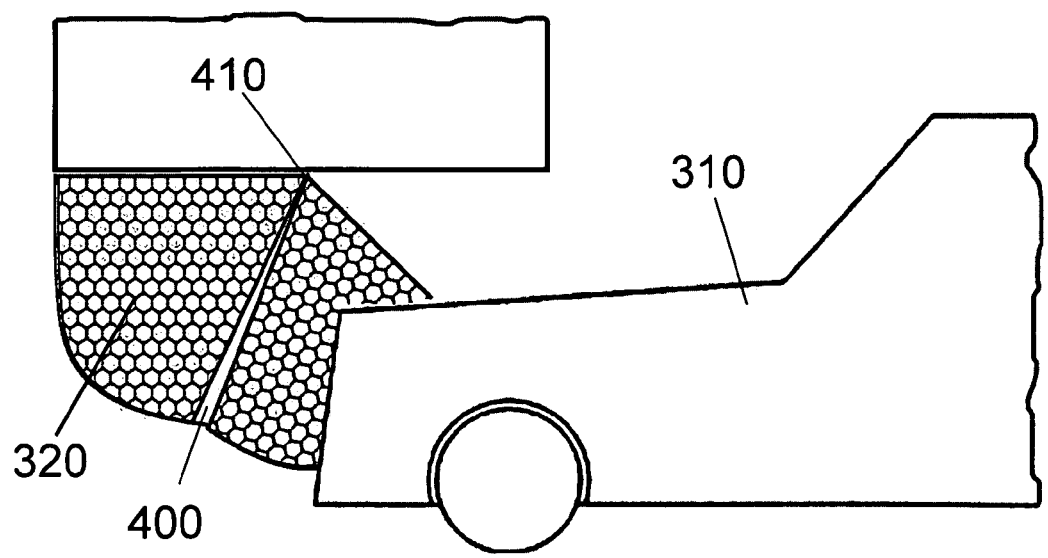
FIG. 41 is a sectional view of a vehicle impacting an aerodynamic underride guard with three regions having crash attenuating foam.

FIG. 40 illustrates a sectional view of an underride guard that has two compartments filled with crash attenuating foam 320, and a third compartment 400 that is substantially empty. FIG. 41 illustrates a vehicle 310 impacting the underride guard shown in FIG. 40. The substantially empty compartment 400 is compressed more than the compartments with crash attenuating foam 320, thus causing portions of the underride guard to rotate downward about a pivot point 410. The downward rotation of the underride guard increases the amount of material in the path of the impacting vehicle, thus decreasing the likelihood of the vehicle under riding the trailer.

Figure 42:
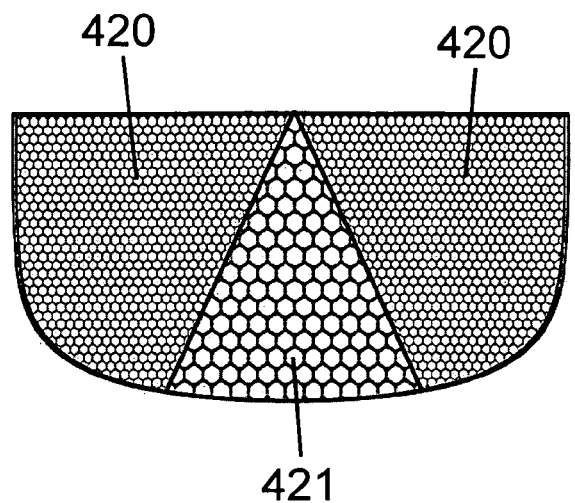
FIG. 42 is a sectional view of an aerodynamic underride guard with three regions having crash attenuating foam.
Figure 43:
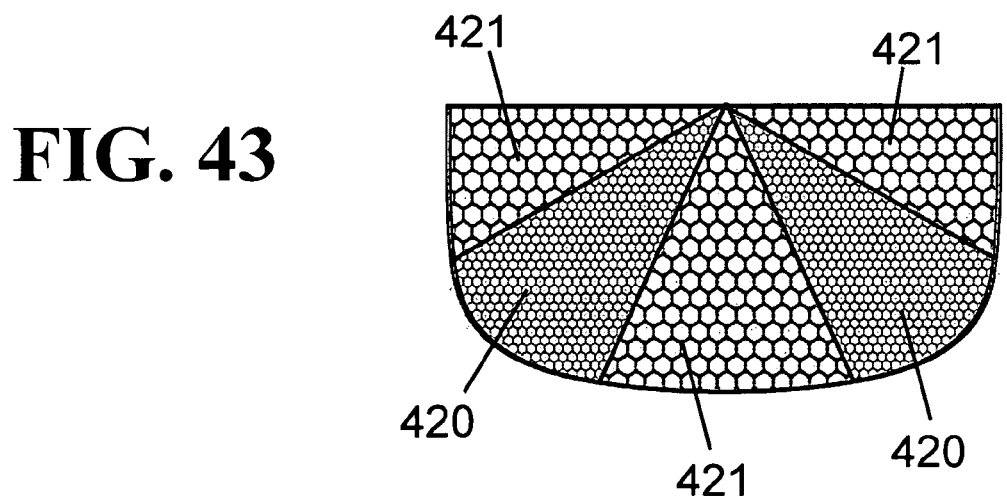
FIG. 43 is a sectional view of an aerodynamic underride guard with five regions having crash attenuating foam.
Figure 44:
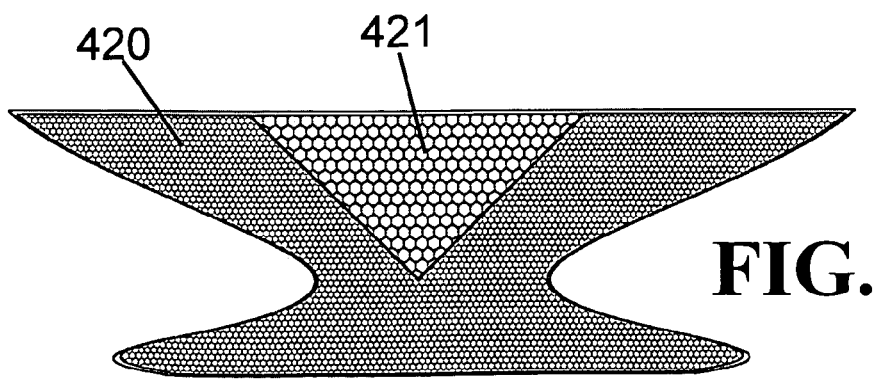
FIG. 44 is a sectional view of a highly curved aerodynamic underride guard with two regions having crash attenuating foam.

FIGS. 42, 43, and 44 illustrate sectional views of aerodynamic underride guards with multiple regions of crash attenuating foam. The use of higher density crash attenuating foam and 420 and lower density crash 421 attenuating foam can be used to cause the underride guard to crumple in a desired pattern upon vehicle impact. The use of less dense foam, or even no foam, in certain regions of the underride guard also reduces the total weight the trailer thereby saving on transportation costs. Additionally, the use of multiple sealed compartments of reduces the likelihood of catastrophic foam degradation from a contaminant during regular operation of the truck and trailer.

Figure 45:
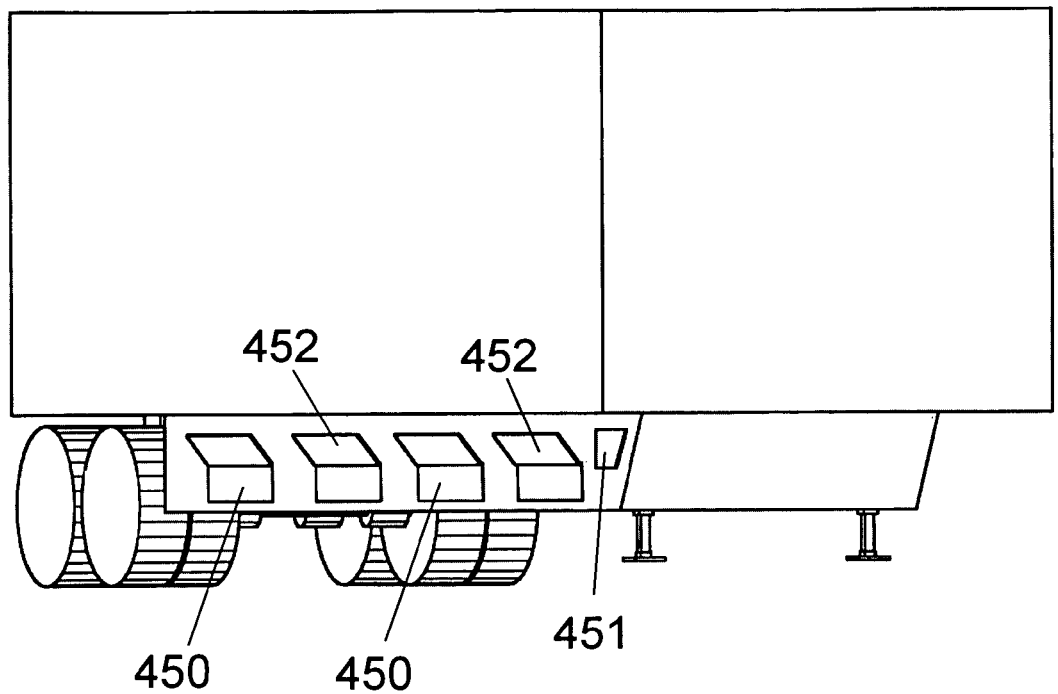
FIG. 45 is a side perspective view of an aerodynamic underride guard with storage compartments and a landing gear access panel.
Figure 46:
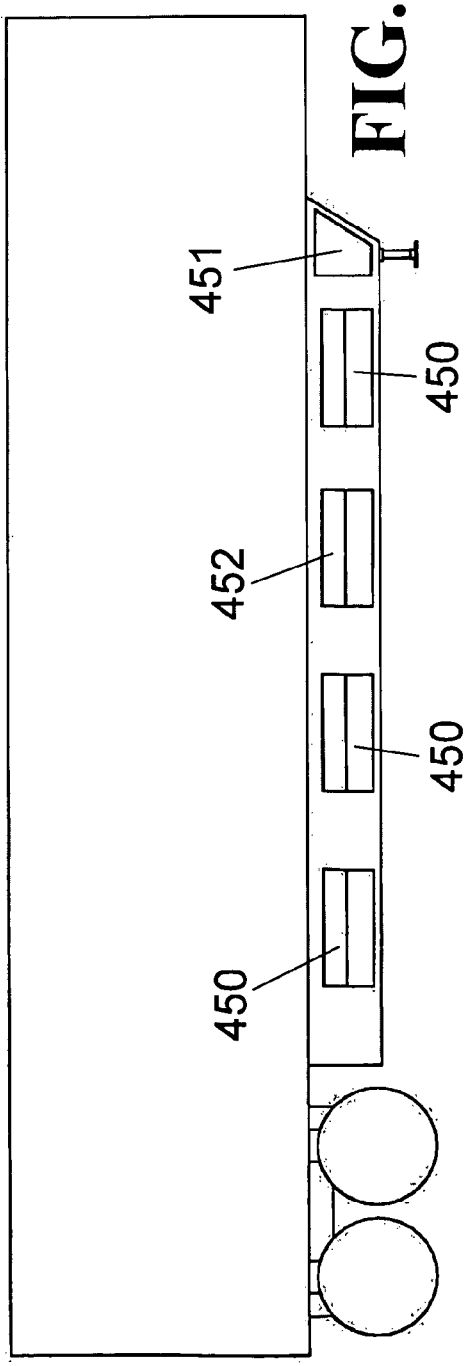
FIG. 46 is a side view of an aerodynamic underride guard with storage compartments and a landing gear access panel.
Figure 47:
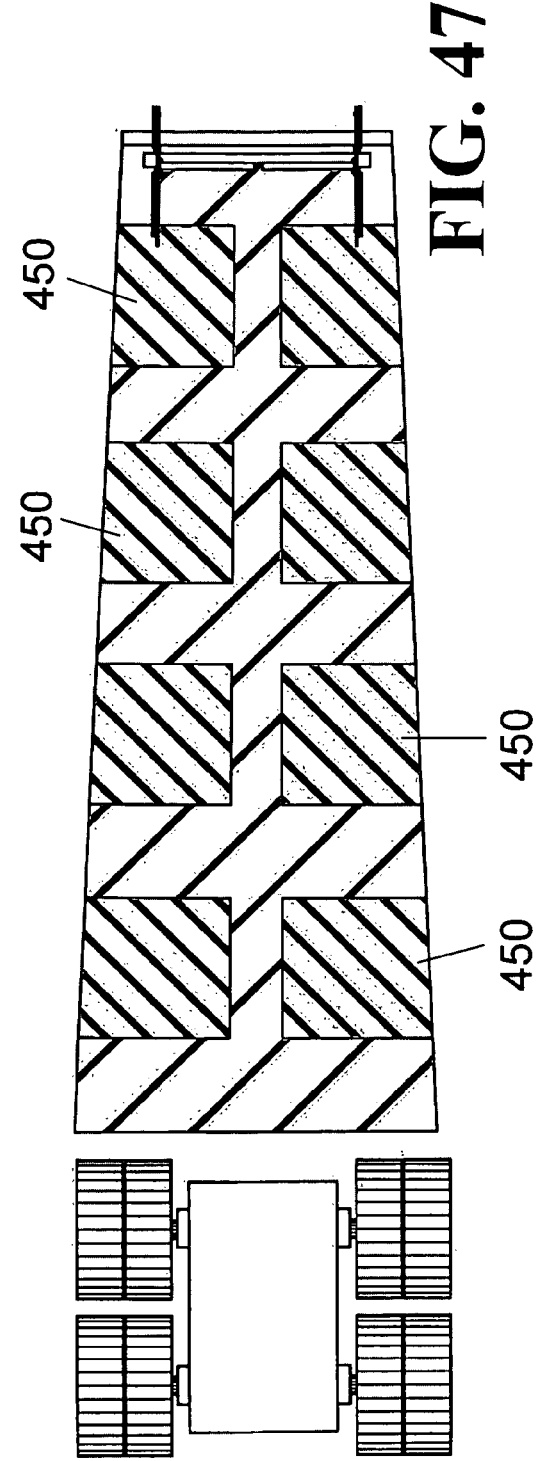
FIG. 47 is a top sectional view of an aerodynamic underride guard with storage compartments.

FIGS. 45, 46, and 47 illustrate a side perspective view, side view, and top sectional view of an aerodynamic underride guard with storage compartments 450 and a landing gear access panel 451. Items, such as spare tires, are often stored below trailers. In the embodiment of the invention illustrated, the aerodynamic underride guard includes compartments of adequate size to store tires and other material commonly transported in the standard operation of a tractor trailer. Such materials may include spare oil for the tractor, tools for the repair of the tractor, spare parts for the tractor or trailer, warning materials for a disabled tractor such as flares, and a variety of other items known to those of reasonable skill in the art. In an exemplary embodiment of the invention, at least one storage compartment 450 or void in the foam would be large enough to accommodate a spare tire for the wheel assembly. Doors 452 on the compartments act to secure the contents of the storage compartment during operation of the tractor trailer as well as maintaining the aerodynamic characteristics of the underride guard.

Operation of trailer landing gear typically requires the operator to rotate a lever to move the retractable portions of the landing gear up or down. An access panel located on the aerodynamic underride guard allows for the operator to easily access the landing gear, while maintaining the aerodynamics of the underride guard. In an exemplary embodiment of the invention, the lever of the landing gear can be unfolded so that portions of the lever are outside of the aerodynamic underride guard.

Figure 48:
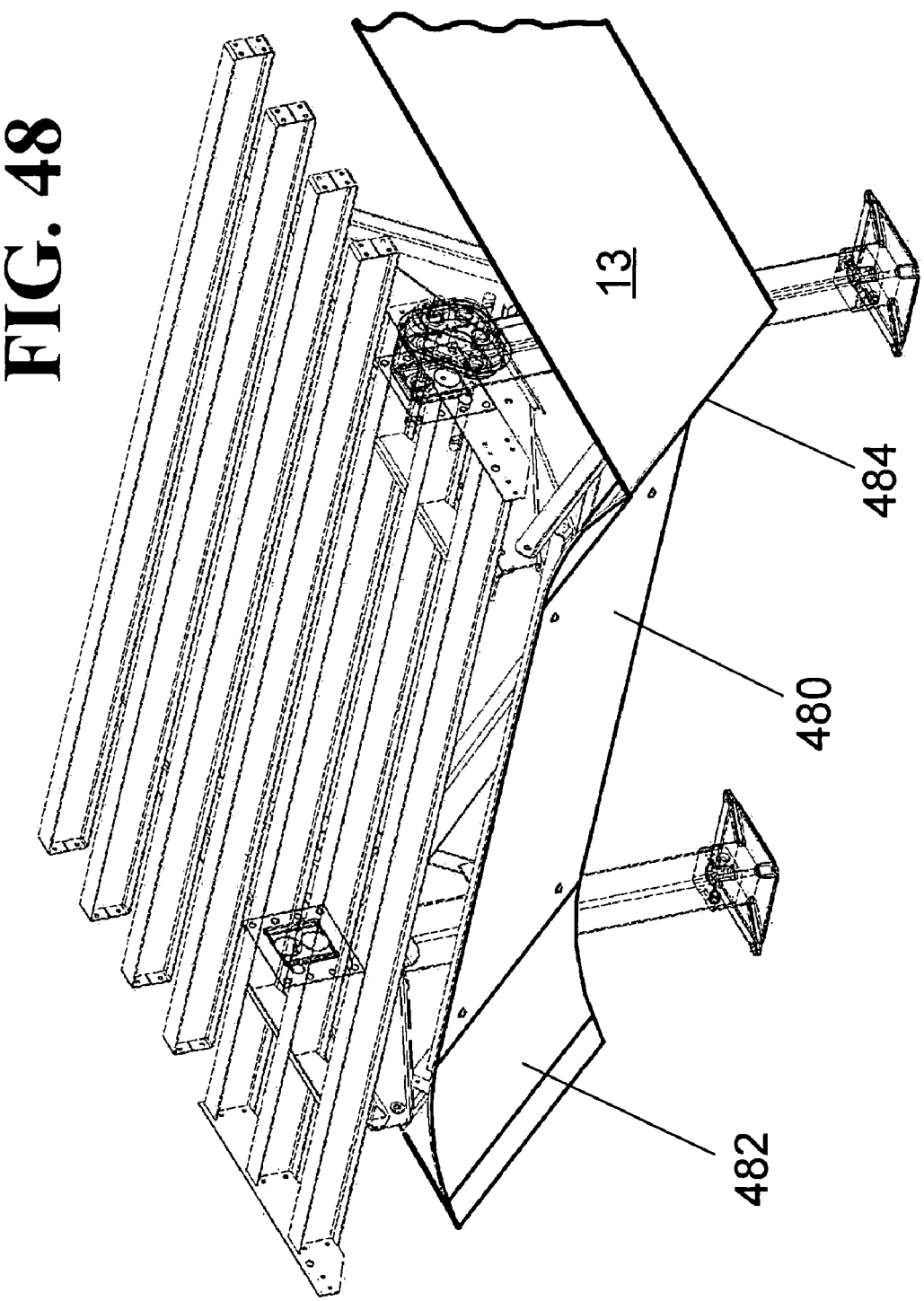
FIG. 48 illustrates an aerodynamic underride guard having a front structure with a substantially planar surface flanked by two substantially concave surfaces.
Figure 49:
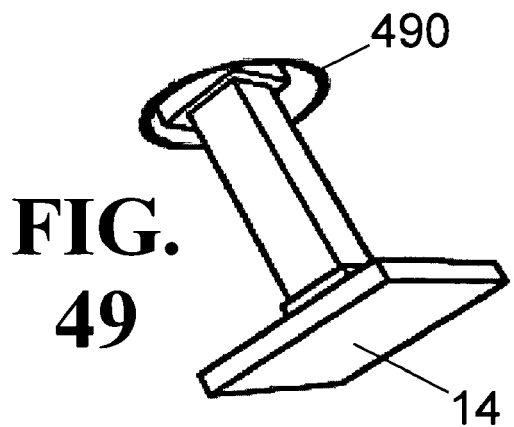
FIG. 49 illustrates a bottom surface of an underride guard having a substantially circular aperture with a geometry substantially defined by a landing gear leg.
Figure 50:
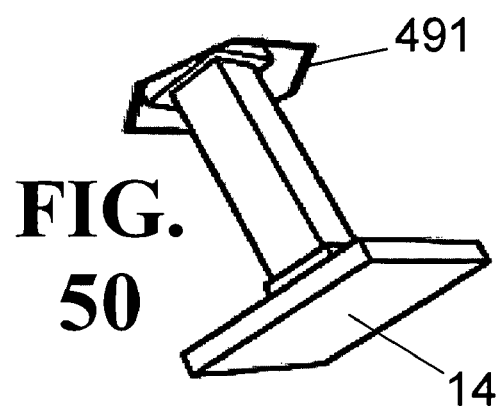
FIG. 50 illustrates a bottom surface of an underride guard having a substantially heptagonal aperture with a geometry substantially defined by a landing gear leg.
Figure 51:
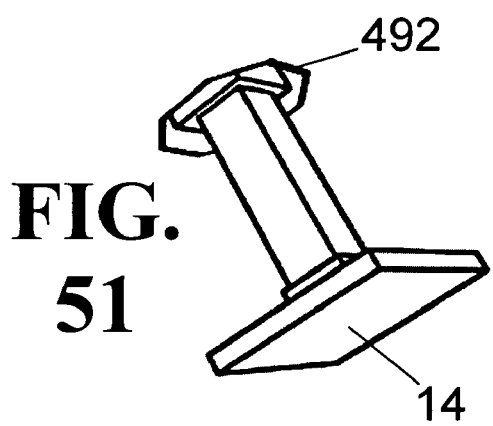
FIG. 51 illustrates a bottom surface of an underride guard having a substantially octagonal aperture with a geometry substantially defined by a landing gear leg.
Figure 52:
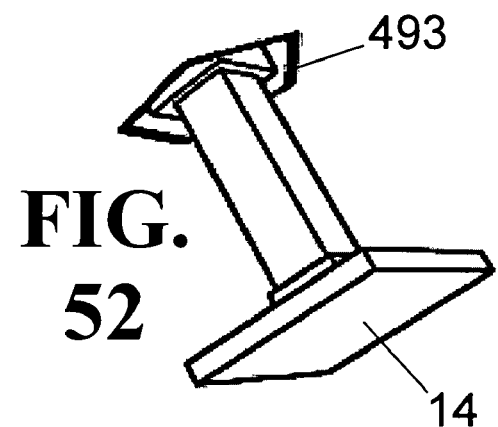
FIG. 52 illustrates a bottom surface of an underride guard having a substantially pentagonal aperture with a geometry substantially defined by a landing gear leg.
Figure 53:
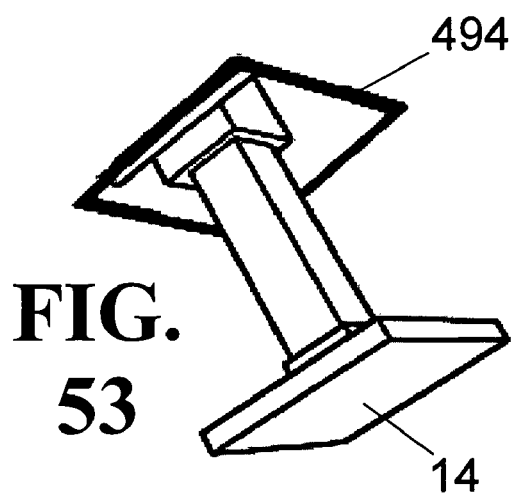
FIG. 53 illustrates a bottom surface of an underride guard having a substantially rectangular aperture with a geometry substantially defined by a landing gear leg.
Figure 54:
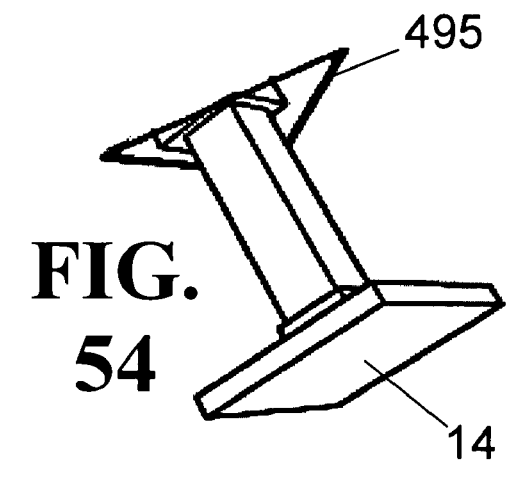
FIG. 54 illustrates a bottom surface of an underride guard having a substantially triangular aperture with a geometry substantially defined by a landing gear leg.

FIG. 48 illustrates an embodiment of the invention where the front fairing surface includes a substantially flat section 480 located between a first concave section 482 and a second concave section 484. The sidewalls 13 of the fairing are connected to the concave sections. The concave sections assist in directing airflow inwards so that outward air currents do not buffet passing motorists.

FIGS. 49-54 illustrate various apertures in the bottom surface of a trailer fairing where the shape of the apertures are substantially defined by a retractable landing gear leg 14. Embodiments of an aperture in the bottom surface of the fairing include circular 490, heptagonal 491, octagonal 492, pentagonal 493, rectangular 494, and triangular 495 openings. The geometry of the apertures may be designed to reduce aerodynamic resistance and protect the non-retractable portions of the landing gear from dirt and debris.

It should be understood that the programs, processes, methods and system described herein are not related or limited to any particular type components unless indicated otherwise. Various combinations of general purpose, specialized or equivalent components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, more, fewer or equivalent elements may be used in the embodiments.

The invention claimed is:

1. An over-the-road trailer comprising:
a frame adapted for carrying cargo;
a wheel assembly and a landing gear assembly, each connecting to the frame;
the landing gear assembly including a non-retractable portion capable of moving a plurality of vertically retractable landing gear legs;
a fairing interconnected with and located below the frame, the fairing having a bottom surface extending from about the wheel assembly to about the landing gear assembly;
the plurality of vertically retractable landing gear legs extending through a plurality of apertures in the bottom surface of the fairing; the shape of each aperture substantially defined by a single vertically retractable landing gear leg.

2. The over-the-road trailer of claim 1 further comprising the fairing including a first and second sidewall, the sidewalls separated by a distance substantially similar to the width of the frame;
the bottom surface of the fairing connecting to and extending between the first and second sidewalls.

3. The over-the-road trailer of claim 2 further comprising the fairing having a front surface connecting to the bottom surface and both of the sidewalls;
wherein substantially all of the non-retractable portion of the non-retractable portion of the landing gear assembly is located directly between the front surface and wheel assembly.

4. The over-the-road trailer of claim 3 wherein the front surface includes a substantially flat surface portion connected between a first and second concave surface portion.

5. The over-the-road trailer of claim 3 further comprising an impact-absorbing underride guard connected to the frame of the trailer, wherein substantially all of the underride guard is located directly between the bottom surface and the frame.

6. The over-the-road trailer of claim 5 further comprising the impact-absorbing underride guard having a network of energy absorbing structural supports secured to the frame; and
the frame and the fairing cooperating to enclose both the impact-absorbing underride and the non-retractable portion of the landing gear assembly.

7. The over-the-road trailer of claim 6
the network of energy absorbing structural supports including a plurality of impact absorbing foam sections; and
each of the plurality of vertically retractable landing gear legs having a portion that is always located below the bottom surface of the fairing.

8. The over-the-road trailer of claim 3 further comprising an impact absorbing foam lattice extending between and connecting to both the first and second sidewall.

9. The over-the-road trailer of claim 3 further comprising the non-retractable portion of the landing gear assembly including a first and second fore stabilizer rod,
each stabilizer rod extending towards the frame at a first angle; and
the front surface of the fairing extending from the bottom surface towards the frame at substantially the first angle.

10. The over-the-road trailer of claim 8 further comprising the first and second sidewalls including a plurality of openings;
the foam lattice having a plurality of voids aligned with the plurality of openings;

wherein at least one of the voids is larger than a spare tire for the wheel assembly.

11. The over-the-road trailer of claim 3 further comprising the non-retractable portion of the landing gear assembly having a crank for vertically moving the vertically retractable landing gear legs;
the first sidewall having an opening proximal to the crank; and
a door connected to the first sidewall near the opening, the door capable of securing the first opening.

12. The over-the-road trailer of claim 1 further comprising:
a kingpin, each connecting to the frame;
the landing gear assembly located between the kingpin and the wheel assembly;
the landing gear assembly including a first fore stabilizer distant from a second fore stabilizer,
   each fore stabilizer connecting to one of a plurality of receivers adapted for vertically moving one of the vertically retractable landing gear legs, and
   each fore stabilizer substantially located between one of the plurality of receivers and the kingpin; and
the fairing including a front structure extending between and connecting to both the first fore stabilizer and the second fore stabilizer,
the fairing having a first and second sidewall, each sidewall connecting to the front structure and extending to about the wheel assembly.

13. The over-the-road trailer of 12 wherein the first sidewall has a cross-section with a first convex section, a second convex section, and a first concave section; the first concave section connecting between the first and second convex sections.

14. The over-the-road trailer of claim 13 further comprising
the second concave section of the first sidewall substantially surrounding a horizontal impact member.

15. The over-the-road trailer of claim 12 further comprising
an impact absorbing foam lattice extending between and connecting to both the first and second sidewall;
the foam lattice including a resilient section with a high density foam and a compression section with a low density foam.

16. The over-the-road trailer of claim 15 further comprising
the first and second sidewalls including a plurality of openings;
the foam lattice having a plurality of voids aligned with the plurality of openings;
wherein at least one on void is larger than a spare tire for the wheel assembly.

* * * * *